(12) United States Patent
Wei

(10) Patent No.: US 11,356,634 B2
(45) Date of Patent: Jun. 7, 2022

(54) METHOD OF PROCESSING VIDEO DATA, APPARATUS FOR PROCESSING VIDEO DATA, DISPLAY APPARATUS, AND COMPUTER-PROGRAM PRODUCT

(71) Applicant: BOE Technology Group Co., Ltd., Beijing (CN)

(72) Inventor: Chuang Wei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 599 days.

(21) Appl. No.: 16/336,606

(22) PCT Filed: Jun. 26, 2018

(86) PCT No.: PCT/CN2018/092833
§ 371 (c)(1),
(2) Date: Mar. 26, 2019

(87) PCT Pub. No.: WO2019/165731
PCT Pub. Date: Sep. 6, 2019

(65) Prior Publication Data
US 2021/0360191 A1 Nov. 18, 2021

(30) Foreign Application Priority Data
Feb. 28, 2018 (CN) .......................... 201810168190.6

(51) Int. Cl.
*H04N 7/01* (2006.01)
*G09G 5/00* (2006.01)

(52) U.S. Cl.
CPC ........... *H04N 7/0117* (2013.01); *G09G 5/005* (2013.01); *G09G 5/006* (2013.01); *H04N 7/0145* (2013.01)

(58) Field of Classification Search
CPC .. H04N 7/0117; H04N 7/0145; H04N 7/0135; H04N 7/0137; H04N 7/014;
(Continued)

(56) References Cited

U.S. PATENT DOCUMENTS 7,864,203 B1 * 1/2011 Fear ...................... G09G 5/003
345/698
2008/0043141 A1 2/2008 Namioka
(Continued)

FOREIGN PATENT DOCUMENTS

CN 101098393 A 1/2008
CN 101562733 A 10/2009
(Continued)

OTHER PUBLICATIONS

International Search Report & Written Opinion dated Nov. 20, 2018, regarding PCT/CN2018/092833.
(Continued)

*Primary Examiner* — Michael E Teitelbaum
(74) *Attorney, Agent, or Firm* — Intellectual Valley Law, P.C.

(57) ABSTRACT

The present application provides a method of processing video data. The method of processing video data includes obtaining a frame of video including M numbers of first pixel groups along a first direction, each of the M numbers of first pixel groups including N numbers of pixels along a second direction, M and N being positive integers; determining Q numbers of first pixel sets for each respective one of the M numbers of first pixel groups; assigning Q numbers of pixels values respectively to the Q numbers of first pixel sets for each respective one of the M numbers of first pixel groups; generating M numbers of second pixel groups respectively for the M numbers of first pixel groups; and obtaining a processed frame of video including the M numbers of second pixel groups along the first direction.

18 Claims, 8 Drawing Sheets

(58) Field of Classification Search
CPC .. H04N 7/0142; H04N 7/0147; H04N 7/0122; H04N 7/0102; H04N 7/01; G09G 5/005; G09G 5/006
See application file for complete search history.

(56) References Cited

U.S. PATENT DOCUMENTS

| | | |
|---|---|---|
| 2012/0050610 A1 | 3/2012 | Zhao |
| 2014/0028919 A1* | 1/2014 | Lin .................. G06T 3/4092 348/581 |
| 2014/0098289 A1 | 4/2014 | Jang et al. |
| 2017/0223307 A1 | 8/2017 | Ono |

FOREIGN PATENT DOCUMENTS

| | | |
|---|---|---|
| CN | 105447819 A | 3/2016 |
| CN | 105681720 A | 6/2016 |
| CN | 107197329 A | 9/2017 |
| CN | 107734281 A | 2/2018 |

OTHER PUBLICATIONS

First Office Action in the Chinese Patent Application No. 201810168190. 6, dated Aug. 21, 2019; English translation attached.

* cited by examiner

METHOD OF PROCESSING VIDEO DATA, APPARATUS FOR PROCESSING VIDEO DATA, DISPLAY APPARATUS, AND COMPUTER-PROGRAM PRODUCT

CROSS-REFERENCE TO RELATED APPLICATION

This application claims priority to Chinese Patent Application No. 201810168190.6, filed Feb. 28, 2018, the contents of which are incorporated by reference in the entirety.

TECHNICAL FIELD

The present invention relates to display technology, more particularly, to a method of processing video data, an apparatus for processing video data, a display apparatus, and a computer-program product.

BACKGROUND

Various different video formats have been available. Typically, different video formats correspond to different resolutions. For example, the resolution for Full High Definition (FHD) video format is 1920*1080, while the resolution for High Definition (HD) video format is 1280*720. Typically, a display apparatus such as a mobile phone has its own display resolution. When a video is played in the display apparatus, the discrepancy between the resolution of the video format and the display resolution often results in compromised display quality.

SUMMARY

In one aspect, the present invention provides a method of processing video data, comprising obtaining a frame of video comprising M numbers of first pixel groups along a first direction, each of the M numbers of first pixel groups comprising N numbers of pixels along a second direction, M and N being positive integers; determining Q numbers of first pixel sets for each respective one of the M numbers of first pixel groups, each of the Q numbers of first pixel sets comprising a plurality of adjacent pixels in a respective one of the M numbers of first pixel groups, Q being a positive integer; assigning Q numbers of pixels values respectively to the Q numbers of first pixel sets for each respective one of the M numbers of first pixel groups, each of the Q numbers of pixel values being assigned based on pixel values of all pixels in a respective one of the Q numbers of first pixel sets; generating M numbers of second pixel groups respectively for the M numbers of first pixel groups, each of the M numbers of second pixel groups comprising Q numbers of pixels, pixel values of the Q numbers of pixels respectively equal to the Q numbers of pixels values respectively for the Q numbers of first pixel sets for a respective one of the M numbers of first pixel groups; and obtaining a processed frame of video comprising the M numbers of second pixel groups along the first direction.

Optionally, Q>N, and Q is a non-integer multiple of N.

Optionally, the processed frame of video comprises Q number of third pixel groups along the second direction, each of the Q numbers of third pixel groups comprising M numbers of pixels along the first direction; the method further comprising determining P numbers of second pixel sets for each respective one of the Q numbers of third pixel groups, each of the P numbers of second pixel sets comprising a plurality of adjacent pixels in a respective one of the Q numbers of third pixel groups, P being a positive integer, P>M, and P is a non-integer multiple of M; assigning P numbers of pixels values respectively to the P numbers of second pixel sets for each respective one of the Q numbers of third pixel groups, each of the P numbers of pixel values being assigned based on pixel values of all pixels in a respective one of the P numbers of second pixel sets; generating Q numbers of fourth pixel groups respectively for the Q numbers of third pixel groups, each of the Q numbers of fourth pixel groups comprising P numbers of pixels, pixel values of the P numbers of pixels respectively equal to the P numbers of pixels values respectively for the P numbers of second pixel sets for a respective one of the Q numbers of third pixel groups; and obtaining the processed frame of video comprising the Q numbers of fourth pixel groups along the second direction.

Optionally, determining the Q numbers of first pixel sets for each respective one of the M numbers of first pixel groups comprises determining N numbers of first target pixel sets and (Q−N) numbers of second target pixel sets for each respective one of the M numbers of first pixel groups, Q>N; wherein each of the M numbers of second pixel groups comprises N numbers of first pixels and (Q−N) numbers of second pixels, any two adjacent second pixels of the (Q−N) numbers of second pixels being spaced apart by a same total number of first pixels of the N numbers of first pixels; the N numbers of first target pixel sets respectively correspond to the N numbers of first pixels in a respective one of the M numbers of second pixel groups; and the (Q−N) numbers second target pixel sets respectively correspond to the (Q−N) numbers of second pixels in the respective one of the M numbers of second pixel groups.

Optionally, an i-th first target pixel set of the N numbers of first target pixel sets corresponds to an i-th first pixel of the N numbers of first pixels in the respective one of the M numbers of second pixel groups, 1≤i≤N; and a first pixel in the i-th first target pixel set of the N numbers of first target pixel sets is an i-th pixel in a respective one of the M numbers of first pixel groups.

Optionally, a j-th second target pixel set of the (Q−N) numbers of second target pixel sets corresponds to a j-th second pixel of the (Q−N) numbers of second pixels in the respective one of the M numbers of second pixel groups, 1≤j≤(Q−N); and a first pixel in the j-th second target pixel set of the (Q−N) numbers of second et pixel sets is a z-th pixel in a respective one of the M numbers of first pixel groups; wherein $$z = \frac{j \times q}{q - n} - v - j - 1,$$

v is a constant.

Optionally, determining the Q numbers of first pixel sets for each respective one of the M numbers of first pixel groups comprises adding A numbers of newly added pixel into each respective one of the M numbers of first pixel groups, A≥1; and determining the Q numbers of first pixel sets for each respective one of the M numbers of first pixel groups having the at least one newly added pixel; wherein a pixel value of each of the at least one newly added pixel is equal to a pixel value of a pixel in a respective one of the M numbers of first pixel groups; and A=B−1, B is a total number of pixels in each of the N numbers of first target pixel sets.

Optionally, assigning the Q numbers of pixels values respectively to the Q numbers of first pixel sets for each respective one of the M numbers of first pixel groups comprises determining correlation coefficients respectively for pixels in each of the Q numbers of first pixel sets for each respective one of the M numbers of first pixel groups; and assigning the Q numbers of pixels values respectively to the Q numbers of first pixel sets for each respective one of the M numbers of first pixel groups based on the correlation coefficients and the pixel values of all pixels in the respective one of the Q numbers of first pixel sets; wherein each of the correlation coefficients represents a degree of correlation between a respective pixel in the respective one of the Q numbers of first pixel sets and a respective one of the Q numbers of pixels in a respective one of the M numbers of second pixel groups.

Optionally, determining the correlation coefficients respectively for the pixels in each of the Q numbers of first pixel sets for each respective one of the M numbers of first pixel groups comprises determining relative distances respectively between the respective one of the Q numbers of pixels in the respective one of the M numbers of second pixel groups and pixels in the respective one of the Q numbers of first pixel sets; and determining the correlation coefficients respectively for the pixels in each of the Q numbers of first pixel sets for each respective one of the M numbers of first pixel groups based on the relative distances.

In another aspect, the present invention provides an apparatus for processing video data, comprising a memory; and one or more processors; wherein the memory and the one or more processors are connected with each other, and the memory stores computer-executable instructions for controlling the one or more processors to obtain a frame of video comprising M numbers of first pixel groups along a first direction, each of the M numbers of first pixel groups comprising N numbers of pixels along a second direction, M and N being positive integers; determine Q numbers of first pixel sets for each respective one of the M numbers of first pixel groups, each of the Q numbers of first pixel sets comprising a plurality of adjacent pixels in a respective one of the M numbers of first pixel groups, Q being a positive integer assign Q numbers of pixels values respectively to the Q numbers of first pixel sets for each respective one of the M numbers of first pixel groups, each of the Q numbers of pixel values being assigned based on pixel values of all pixels in a respective one of the Q numbers of first pixel sets; generate M numbers of second pixel groups respectively for the M numbers of first pixel groups, each of the M numbers of second pixel groups comprising Q numbers of pixels, pixel values of the Q numbers of pixels respectively equal to the Q numbers of pixels values respectively for the Q numbers of first pixel sets for a respective one of the M numbers of first pixel groups; and obtain a processed frame of video comprising the M numbers of second pixel groups along the first direction.

Optionally, Q>N, and Q is a non-integer multiple of N.

Optionally, the processed frame of video comprises Q number of third pixel groups along the second direction, each of the Q numbers of third pixel groups comprising M numbers of pixels along the first direction; the memory further stores computer-executable instructions for controlling the one or more processors to determine P numbers of second pixel sets for each respective one of the Q numbers of third pixel groups, each of the P numbers of second pixel sets comprising a plurality of adjacent pixels in a respective one of the Q numbers of third pixel groups, P being a positive integer, P>M, and P is a non-integer multiple of M; assign P numbers of pixels values respectively to the P numbers of second pixel sets for each respective one of the Q numbers of third pixel groups, each of the P numbers of pixel values being assigned based on pixel values of all pixels in a respective one of the P numbers of second pixel sets; generate Q numbers of fourth pixel groups respectively for the Q numbers of third pixel groups, each of the Q numbers of fourth pixel groups comprising P numbers of pixels, pixel values of the P numbers of pixels respectively equal to the P numbers of pixels values respectively for the P numbers of second pixel sets for a respective one of the Q numbers of third pixel groups; and obtain the processed frame of video comprising the Q numbers of fourth pixel groups along the second direction.

Optionally, the memory further stores computer-executable instructions for controlling the one or more processors to determine N numbers of first target pixel sets and (Q−N) numbers of second target pixel sets for each respective one of the M numbers of first pixel groups, thereby determining the Q numbers of first pixel sets for each respective one of the M numbers of first pixel groups, Q>N; wherein each of the M numbers of second pixel groups comprises N numbers of first pixels and (Q−N) numbers of second pixels, any two adjacent second pixels of the (Q−N) numbers of second pixels being spaced apart by a same total number of first pixels of the N numbers of first pixels; the N numbers of first target pixel sets respectively correspond to the N numbers of first pixels in a respective one of the M numbers of second pixel groups; and the (Q−N) numbers second target pixel sets respectively correspond to the (Q−N) numbers of second pixels in the respective one of the M numbers of second pixel groups.

Optionally, an i-th first target pixel set of the N numbers of first target pixel sets corresponds to an i-th first pixel of the N numbers of first pixels in the respective one of the M numbers of second pixel groups, 1≤i≤N; and a first pixel in the i-th first target pixel set of the N numbers of first target pixel sets is an i-th pixel in a respective one of the M numbers of first pixel groups.

Optionally, a j-th second target pixel set of the (Q−N) numbers of second target pixel sets corresponds to a j-th second pixel of the (Q−N) numbers of second pixels in the respective one of the M numbers of second pixel groups, 1≤j≤(Q−N); and a first pixel in the j-th second target pixel set of the (Q−N) numbers of second target pixel sets is a z-th pixel in a respective one of the M numbers of first pixel groups; wherein $$z = \frac{j \times q}{q-n} - v - j - 1,$$

v is a constant.

Optionally, the memory further stores computer-executable instructions for controlling the one or more processors to add A numbers of newly added pixel into each respective one of the M numbers of first pixel groups, A≥1; and determine the Q numbers of first pixel sets for each respective one of the M numbers of first pixel groups having the at least one newly added pixel; wherein a pixel value of each of the at least one newly added pixel is equal to a pixel value of a pixel in a respective one of the M numbers of first pixel groups; and A=B−1, B is a total number of pixels in each of the N numbers of first target pixel sets.

Optionally, the memory further stores computer-executable instructions for controlling the one or more processors to determine correlation coefficients respectively for pixels in each of the Q numbers of first pixel sets for each respective one of the M numbers of first pixel groups; and assign the Q numbers of pixels values respectively to the Q numbers of first pixel sets for each respective one of the M numbers of first pixel groups based on the correlation coefficients and the pixel values of all pixels in the respective one of the Q numbers of first pixel sets; wherein each of the correlation coefficients represents a degree of correlation between a respective pixel in the respective one of the Q numbers of first pixel sets and a respective one of the Q numbers of pixels in a respective one of the M numbers of second pixel groups.

Optionally, the memory further stores computer-executable instructions for controlling the one or more processors to determine relative distances respectively between the respective one of the Q numbers of pixels in the respective one of the M numbers of second pixel groups and pixels in the respective one of the Q numbers of first pixel sets; and determine the correlation coefficients respectively for the pixels in each of the Q numbers of first pixel sets for each respective one of the M numbers of first pixel groups based on the relative distances.

In another aspect, the present invention provides a display apparatus comprising the apparatus for processing video data described herein.

In another aspect, the present invention provides a computer-program product comprising a non-transitory tangible computer-readable medium having computer-readable instructions thereon, the computer-readable instructions being executable by a processor to cause the processor to perform obtaining a frame of video comprising M numbers of first pixel groups along a first direction, each of the M numbers of first pixel groups comprising N numbers of pixels along a second direction, M and N being positive integers; determining Q numbers of first pixel sets for each respective one of the M numbers of first pixel groups, each of the Q numbers of first pixel sets comprising a plurality of adjacent pixels in a respective one of the M numbers of first pixel groups, Q being a positive integer; assigning Q numbers of pixels values respectively to the Q numbers of first pixel sets for each respective one of the M numbers of first pixel groups, each of the Q numbers of pixel values being assigned based on pixel values of all pixels in a respective one of the Q numbers of first pixel sets; generating M numbers of second pixel groups respectively for the M numbers of first pixel groups, each of the M numbers of second pixel groups comprising Q numbers of pixels, pixel values of the Q numbers of pixels respectively equal to the Q numbers of pixels values respectively for the Q numbers of first pixel sets for a respective one of the M numbers of first pixel groups; and obtaining a processed frame of video comprising the M numbers of second pixel groups along the first direction.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Due to the availability of many different video formats, frequently a discrepancy exists between the video resolution of the video to be played and the display resolution of the display apparatus. For example, a high definition display apparatus typically has a display resolution of 4096*2160. When a Full High Definition video is played in the high definition display apparatus, a discrepancy exists between the video resolution (1920*1080) and the display resolution. The discrepancy between the video resolution and the display resolution results in compromised display quality.

Accordingly, the present disclosure provides, inter alia, a method of processing video data, an apparatus for processing video data, a display apparatus, and a computer-program product that substantially obviate one or more of the problems due to limitations and disadvantages of the related art. The present method, apparatus, computer-program product, and display apparatus process a video data to obtain a processed video having a resolution same as the display resolution when the video resolution of the original video is different from the display resolution, greatly enhancing display quality.

Figure 1A:
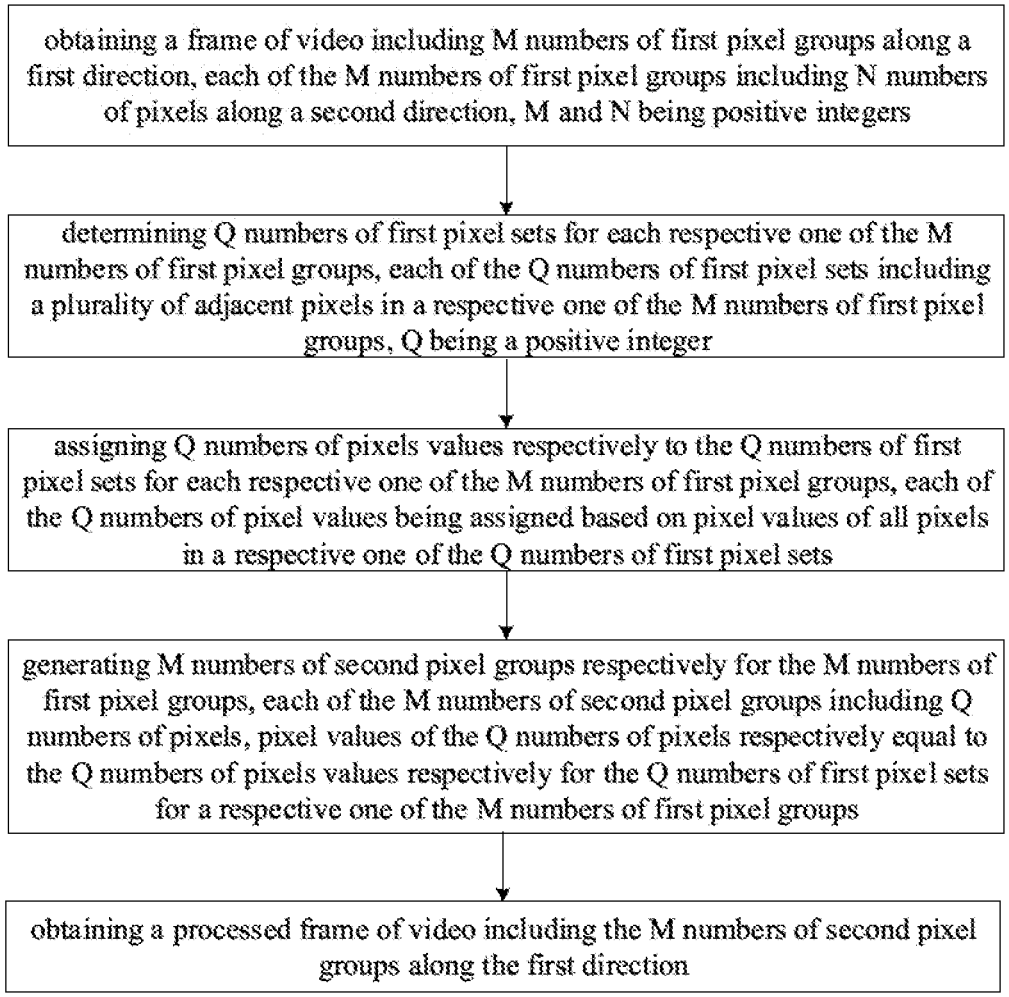
FIG. 1A is a flow chart illustrating a method of processing video data in some embodiments according to the present disclosure.
Figure 1B:
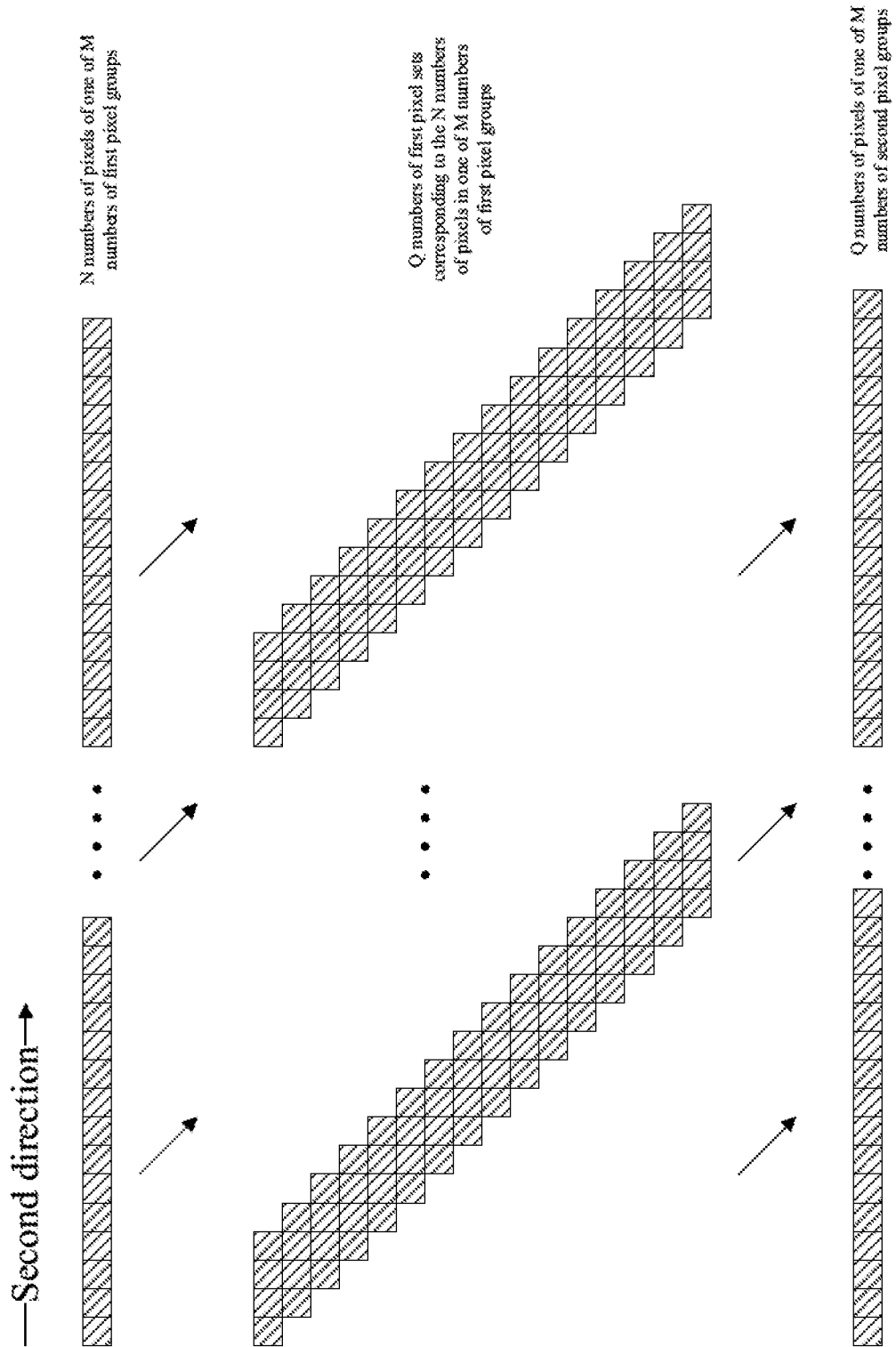
FIG. 1B illustrates a process of obtaining a processed frame of video in some embodiments according to the present disclosure.

In one aspect, the present disclosure provides a method of processing video data. FIG. 1A is a flow chart illustrating a method of processing video data in some embodiments according to the present disclosure. Referring to FIG. 1A, in some embodiments, the method of processing video data includes obtaining a frame of video including M numbers of first pixel groups along a first direction, each of the M numbers of first pixel groups including N numbers of pixels along a second direction, M and N being positive integers; determining Q numbers of first pixel sets for each respective one of the M numbers of first pixel groups, each of the Q numbers of first pixel sets including a plurality of adjacent pixels in a respective one of the M numbers of first pixel groups, Q being a positive integer; assigning Q numbers of pixels values respectively to the Q numbers of first pixel sets for each respective one of the M numbers of first pixel groups, each of the Q numbers of pixel values being assigned based on pixel values of all pixels in a respective one of the Q numbers of first pixel sets; generating M numbers of second pixel groups respectively for the M numbers of first pixel groups, each of the M numbers of second pixel groups including Q numbers of pixels, pixel values of the Q numbers of pixels respectively equal to the Q numbers of pixels values respectively for the Q numbers of first pixel sets for a respective one of the M numbers of first pixel groups; and obtaining a processed frame of video including the M numbers of second pixel groups along the first direction. FIG. 1B illustrates a process of obtaining a processed frame of video in some embodiments according to the present disclosure. Referring to FIG. 1B, N number of pixels of one of M numbers of first pixel groups along the second direction are shown on top of the figure. Based on the N numbers of pixels of one of M numbers of first pixel groups, Q numbers of first pixel sets corresponding to the N numbers of pixels are determined, each of the Q numbers of first pixel sets includes a plurality of adjacent pixels (e.g., four adjacent pixels) in the corresponding one of the M numbers of first pixel groups. Middle panel of FIG. 1B shows Q numbers of first pixel sets corresponding to the N numbers of pixels in one of the M numbers of first pixel groups. Q numbers of pixels values are respectively assigned to the Q numbers of first pixel sets, each of the Q numbers of pixel values being assigned based on pixel values of all pixels in a corresponding one of the Q numbers of first pixel sets. Subsequently, M numbers of second pixel groups respectively corresponding to the M numbers of first pixel groups are generated. Each of the M numbers of second pixel groups including Q numbers of pixels. Pixel values of the Q numbers of pixels respectively equal to the Q numbers of pixels values respectively for the Q numbers of first pixel sets. Bottom panel of FIG. 1B shows Q numbers of pixels of one of the M numbers of second pixel groups.

The present method processes an original frame of video having a M×N resolution, e.g., having M numbers of first pixel groups along the first direction, each of the M numbers of first pixel groups including N numbers of pixels along the second direction. For each respective one of the M numbers of first pixel groups, the present method determines Q numbers of first pixel sets, assigning Q numbers of pixels values respectively to the Q numbers of first pixel sets, and generates M numbers of second pixel groups respectively for the M numbers of first pixel groups, each of the M numbers of second pixel groups including Q numbers of pixels, pixel values of the Q numbers of pixels, thereby obtaining a processed frame of video including the M numbers of second pixel groups along the first direction. The processed frame of video has an increased resolution along the second direction (e.g., increased from N to Q, optionally Q being the display resolution of a display apparatus along the second direction). Accordingly, the present method is capable of converting an original video into a processed video having a resolution along the second direction same as the display resolution along the second direction, significantly enhancing display quality in the display apparatus.

Optionally, Q>N, and Q is a non-integer multiple of N.

Figure 2A:
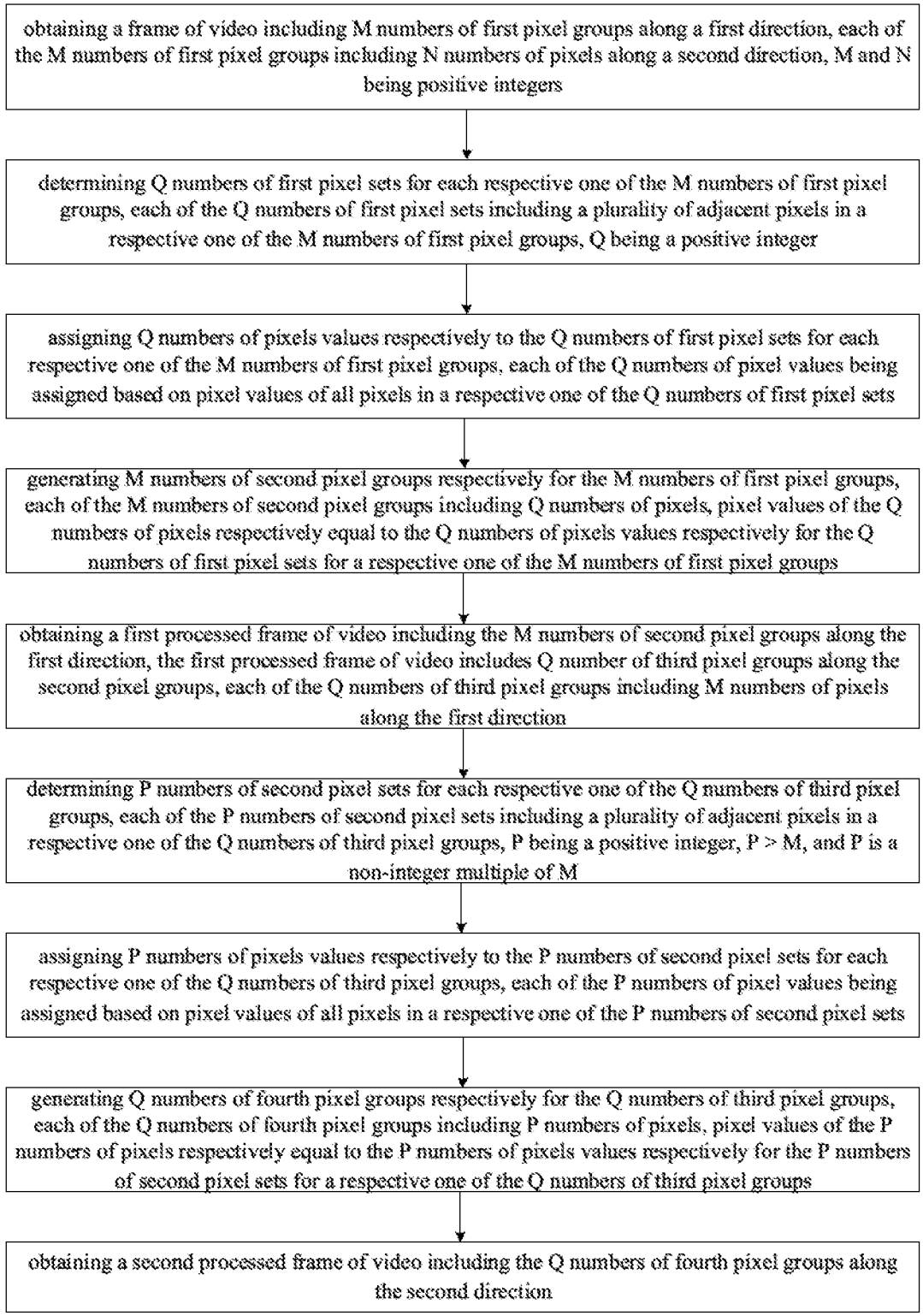
FIG. 2A is a flow chart illustrating a method of processing video data in some embodiments according to the present disclosure.

FIG. 2A is a flow chart illustrating a method of processing video data in some embodiments according to the present disclosure. Referring to FIG. 2A, the method includes two stages, a first stage for obtaining a first processed frame of video and a second stage for obtaining a second processed frame of video. In the first stage, the method includes obtaining a frame of video including M numbers of first pixel groups along a first direction, each of the M numbers of first pixel groups including N numbers of pixels along a second direction, M and N being positive integers; determining Q numbers of first pixel sets for each respective one of the M numbers of first pixel groups, each of the Q numbers of first pixel sets including a plurality of adjacent pixels in a respective one of the M numbers of first pixel groups, Q being a positive integer; assigning Q numbers of pixels values respectively to the Q numbers of first pixel sets for each respective one of the M numbers of first pixel groups, each of the Q numbers of pixel values being assigned based on pixel values of all pixels in a respective one of the Q numbers of first pixel sets; generating M numbers of second pixel groups respectively for the M numbers of first pixel groups, each of the M numbers of second pixel groups including Q numbers of pixels, pixel values of the Q numbers of pixels respectively equal to the Q numbers of pixels values respectively for the Q numbers of first pixel sets for a respective one of the M numbers of first pixel groups; and obtaining a first processed frame of video including the M numbers of second pixel groups along the first direction. Optionally, the first processed frame of video includes Q number of third pixel groups along the second direction, each of the Q numbers of third pixel groups including M numbers of pixels along the first direction.

In the second stage, the method further includes determining P numbers of second pixel sets for each respective one of the Q numbers of third pixel groups, each of the P numbers of second pixel sets including a plurality of adjacent pixels in a respective one of the Q numbers of third pixel groups, P being a positive integer, P>M, and P is a non-integer multiple of M; assigning P numbers of pixels values respectively to the P numbers of second pixel sets for each respective one of the Q numbers of third pixel groups, each of the P numbers of pixel values being assigned based on pixel values of all pixels in a respective one of the P numbers of second pixel sets; generating Q numbers of fourth pixel groups respectively for the Q numbers of third pixel groups, each of the Q numbers of fourth pixel groups including P numbers of pixels, pixel values of the P numbers of pixels respectively equal to the P numbers of pixels values respectively for the P numbers of second pixel sets for a respective one of the Q numbers of third pixel groups; and obtaining a second processed frame of video including the Q numbers of fourth pixel groups along the second direction. Optionally, the second frame of video is the frame of video to be played by the display apparatus.

According to the present method, when a display apparatus obtains a video to played, the display apparatus obtains a frame of video of the video to be played. When a discrepancy exists between the display resolution of the display apparatus and the video resolution of the video to be played, and particularly when the display resolution is greater than the video resolution, and optionally when the display resolution is a non-integer multiple of the video resolution, the method processes the frame of video to render a processed frame of video having a resolution matching with (e.g., same as) the display resolution of the display apparatus, thereby enhancing display quality.

The frame of video may be any frame of video of the video to be played. Optionally, the frame of video is a present frame of video to be played in the display apparatus. In some embodiments, the pixels in the frame of video are arranged in an array of pixels along a first direction and a second direction. Optionally, the frame of video includes a plurality of first pixel groups along the first direction. Each of the plurality of first pixel groups includes a plurality of pixels along the second direction. The first direction and the second direction intersect with each other. Optionally, the first direction is a row direction, and the second direction is a column direction. Optionally, the first direction is a column direction, and the second direction is a row direction.

In some embodiments, the video to be played has a resolution of N*M. Optionally, the frame of video includes M numbers of first pixel groups along the first direction (e.g., a column direction). Each of the M numbers of first pixel groups includes N numbers of pixels along the second direction (e.g., a row direction). M and N are positive integers.

Figure 2B:
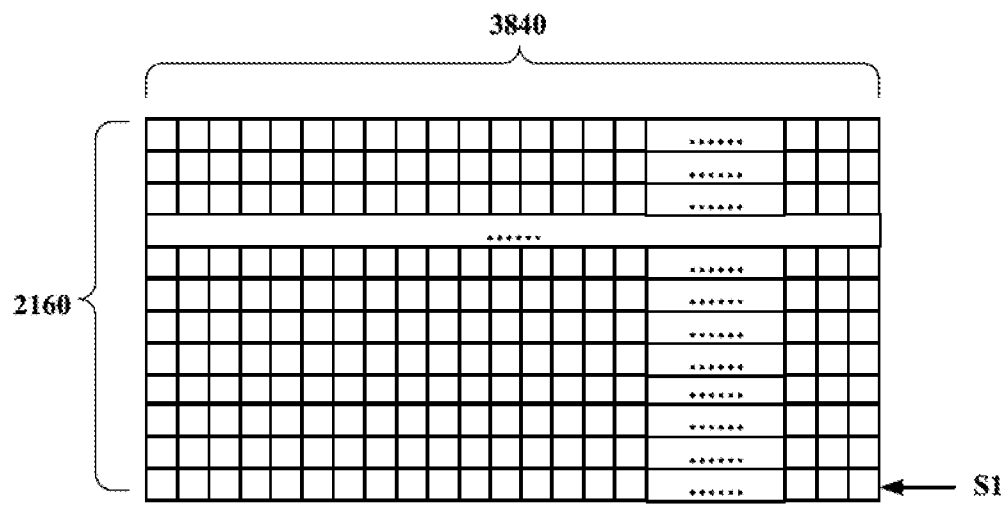
FIG. 2B illustrates a frame of video in some embodiments according to the present disclosure.

FIG. 2B illustrates a frame of video in some embodiments according to the present disclosure. Referring to FIG. 2B, the video to be played in some embodiments has an FHD video format with a video resolution of 3840*2160. Thus, the frame of video includes 2160 numbers of first pixel groups along the first direction (e.g., the column direction). Each of the 2160 numbers of first pixel groups includes 3840 numbers of pixels along the second direction (e.g., the row direction). The frame of video has a resolution of 2160 along the first direction and a resolution of 3840 along the second direction.

In some embodiments, when a discrepancy exists between the display resolution of the display apparatus along the second direction and the video resolution along the second direction of the video to be played, and particularly when the display resolution along the second direction is greater than the video resolution along the second direction, and optionally when the display resolution along the second direction is a non-integer multiple of the video resolution along the second direction, the display apparatus processes the frame of video to render a processed frame of video having a resolution along the second direction matching with (e.g., same as) the display resolution along the second direction of the display apparatus, thereby enhancing display quality.

In some embodiments, the display apparatus is configured to determine Q numbers of first pixel sets for each respective one of the M numbers of first pixel groups, each of the Q numbers of first pixel sets including a plurality of adjacent pixels in a respective one of the M numbers of first pixel groups, Q being a positive integer. By first determining the Q numbers of first pixel sets, the display apparatus subsequently can generate M numbers of second pixel groups respectively for the M numbers of first pixel groups, e.g., the M numbers of second pixel groups respectively corresponding to the M numbers of first pixel groups. Each of the M numbers of second pixel groups includes Q numbers of pixels respectively corresponding to the Q numbers of first pixel sets (e.g., in a one-to-one correspondence relationship). In one example, Q is the display resolution along the second direction of the display apparatus. Because each of the M numbers of second pixel groups includes Q numbers of pixels, the first processed frame of video obtained based on the M numbers of second pixel groups has a resolution along the second direction same as the display resolution along the second direction of the display apparatus. The resolution discrepancy between the video to be played and the display apparatus is obviated, thereby enhancing display quality. Q is a positive integer.

In some embodiments, each of the M numbers of second pixel groups includes N numbers of first pixels and (Q−N) numbers of second pixels. Optionally, any two adjacent second pixels of the (Q−N) numbers of second pixels are spaced apart by a same total number of first pixels of the N numbers of first pixels.

In some embodiments, the Q numbers of first pixel sets for each respective one of the M numbers of first pixel groups include N numbers of first target pixel sets and (Q−N) numbers of second target pixel sets. Accordingly, the step of determining the Q numbers of first pixel sets for each respective one of the M numbers of first pixel groups in some embodiments includes determining N numbers of first target pixel sets and (Q−N) numbers of second target pixel sets for each respective one of the M numbers of first pixel groups. The N numbers of first target pixel sets respectively correspond to the N numbers of first pixels in a respective one of the M numbers of second pixel groups. The (Q−N) numbers second target pixel sets respectively correspond to the (Q−N) numbers of second pixels in the respective one of the M numbers of second pixel groups. Optionally, each of the N numbers of first target pixel sets includes B numbers of adjacent pixels in a respective one of the M numbers of first pixel groups, and each of the (Q−N) numbers of second target pixel sets includes C numbers of adjacent pixels in the respective one of the M numbers of first pixel groups. Optionally, B and C am positive integers greater than 1. Optionally, B=C. Optionally, B is different from C.

Referring to FIG. 2B, the display resolution of the display apparatus is 4096*2160, i.e., the display resolution along the second direction is 4096, which is greater than the resolution along the second direction of the frame of video, 3840. Accordingly, for each of the M numbers of first pixel groups in the frame of video as shown in FIG. 2B, the display apparatus can determine 4096 numbers of first pixel sets.

In one example, and referring to FIG. 2B, the M numbers of first pixel groups includes a first pixel group S1. The display apparatus determines 4096 numbers of first pixel sets for the first pixel group S1. The 4096 numbers of first pixel sets for the first pixel group S1 include 3840 numbers of first target pixel sets and 256 numbers of second target pixel sets.

In some embodiments, an i-th first target pixel set of the N numbers of first target pixel sets corresponds to an i-th first pixel of the N numbers of first pixels in the respective one of the M numbers of second pixel groups, 1≤i≤N. Optionally, a first pixel in the i-th first target pixel set of the N numbers of first target pixel sets is an i-th pixel in a respective one of the M numbers of first pixel groups.

In one example, the display apparatus determines 3840 numbers of first target pixel sets for the first pixel group S1. The i-th first target pixel set of the 3840 numbers of first target pixel sets corresponds to an i-th first pixel of 3840 numbers of first pixels in a second pixel group S2 of the M numbers of second pixel groups. The M numbers of second pixel groups respectively correspond to the M numbers of first pixel groups, e.g., the second pixel group S2 corresponds to the first pixel group S1. Each of the M numbers of second pixel groups includes 4096 numbers of pixels, which include 3840 numbers of first pixels and 256 numbers of second pixels. For example, the second pixel group S2 includes 4096 numbers of pixels, which include 3840 numbers of first pixels and 256 numbers of second pixels. Any two adjacent second pixels of the 256 numbers of second pixels are spaced apart by 15 numbers of first pixels of the 3840 numbers of first pixels. Optionally, the i-th first target pixel set of the 3840 numbers of first target pixel sets includes B numbers of pixels. The first pixel in the B numbers of pixels in the i-th first target pixel set is an i-th pixel in a respective one of the M numbers of first pixel groups (e.g., an i-th pixel in the first pixel group S1 as shown in FIG. 2B).

In one example, the display apparatus determines 3840 numbers of first target pixel sets for the first pixel group S1. The $1^{st}$ first target pixel set of the 3840 numbers of first target pixel sets corresponds to a $1^{st}$ first pixel in of 3840 numbers of first pixels in the second pixel group S2. The $1^{st}$ first target pixel set includes B numbers of adjacent pixels in the first pixel group S1. The B numbers of adjacent pixels in the first pixel group S1 are respectively the $1^{st}$ pixel, the $2^{nd}$ pixel, ..., the (B−1)-th pixel, and the B-th pixel of the first pixel group S1.

In some embodiments, for each of the M numbers of first pixel groups, each of the N numbers of first target pixel sets includes B numbers of adjacent pixels except for the last (B−1) numbers of first target pixel sets of the N numbers of first target pixel sets. For example, for the last (B−1) numbers of first target pixel sets of the N numbers of first target pixel sets, each first target pixel set includes less than B numbers of adjacent pixels.

To illustrate, 3840 numbers of first target pixel sets can be determined for the first pixel group S1 in FIG. 2B. In one example, B=4. The last 3 first target pixel sets of the 3840 numbers of first target pixel sets are respectively the 3838-th first target pixel set, the 3839-th first target pixel set, and the 3840-th first target pixel set. The 3838-th first target pixel set includes only 3 adjacent pixels, i.e., the 3838-th pixel, the 3839-th pixel, and the 3840-th pixel of the first pixel group S1. The 3839-th first target pixel set includes only 2 adjacent pixels, i.e., the 3839-th pixel and the 3840-th pixel of the first pixel group S1. The 3840-th first target pixel set includes only 1 pixel, i.e., the 3840-th pixel of the first pixel group S1. Thus, each of the last 3 first target pixel sets of the 3840 numbers of first target pixel sets includes less than 4 adjacent pixels.

In some embodiments, for each of the M numbers of first pixel groups, each of the N numbers of first target pixel sets includes B numbers of adjacent pixels, even for the last (B−1) numbers of first target pixel sets of the N numbers of first target pixel sets. To achieve this, the method optionally includes a step of adding newly added pixel into each of the M numbers of first pixel groups. In some embodiments, the step of determining the Q numbers of first pixel sets for each respective one of the M numbers of first pixel groups includes adding A numbers of newly added pixel into each respective one of the M numbers of first pixel groups, A≥1; and determining the Q numbers of first pixel sets for each respective one of the M numbers of first pixel groups having the at least one newly added pixel. Optionally, a pixel value of each of the at least one newly added pixel is equal to a pixel value of a pixel in a respective one of the M numbers of first pixel groups. Optionally, A=B−1, B is a total number of pixels in each of the N numbers of first target pixel sets.

To illustrate, 3840 numbers of first target pixel sets can be determined for the first pixel group S1 in FIG. 2B. In one example, B=4. The display apparatus adds three newly added pixels (e.g., (B−1) numbers of newly added pixels) into the first pixel group S1. In one example, a first one of the three newly added pixels is added before the first pixel of the first pixel group S1, and optionally, a pixel value of the first pixel of the first pixel group S1 can be assigned as a pixel value of the first one of the three newly added pixels. In another example, the second one and the third one of the three newly added pixels are added after the last pixel of the first pixel group S1, and optionally, pixel values of the last two pixel of the first pixel group S1 can be assigned as pixel values of the second one and the third one of the three newly added pixels. The display apparatus determines the 3840 numbers of first target pixel sets. The 3838-th first target pixel set includes the 3838-th pixel, the 3839-th pixel, the 3840-th pixel, and the 3841-th pixel of the first pixel group S1. The 3839-th first target pixel set includes the 3839-th pixel, the 3840-th pixel, the 3841-th pixel, and the 3842-th pixel of the first pixel group S1. The 3840-th first target pixel set includes the 3840-th pixel, the 3841-th pixel, the 3842-th pixel, and the 3843-th pixel of the first pixel group S1. Thus, for the first pixel group S1, each of the 3840 numbers of first target pixel sets includes 4 adjacent pixels.

In some embodiments, a j-th second target pixel set of the (Q−N) numbers of second target pixel sets corresponds to a j-th second pixel of the (Q−N) numbers of second pixels in the respective one of the M numbers of second pixel groups, 1≤j≤(Q−N). Optionally, a first pixel in the j-th second target pixel set of the (Q−N) numbers of second target pixel sets is a z-th pixel in a respective one of the M numbers of first pixel groups. Optionally, $$z = \frac{j \times q}{q - n} - v - j - 1,$$

v is a constant.

In one example, the display apparatus determines 256 numbers of second target pixel sets for the first pixel group S1. The j-th second target pixel set of the 256 numbers of first target pixel sets corresponds to a j-th second pixel of 256 numbers of second pixels in a second pixel group S2 of the M numbers of second pixel groups. The M numbers of second pixel groups respectively correspond to the M numbers of first pixel groups, e.g., the second pixel group S2 corresponds to the first pixel group S1. Each of the M numbers of second pixel groups includes 4096 numbers of pixels, which include 3840 numbers of first pixels and 256 numbers of second pixels. For example, the second pixel group S2 includes 4096 numbers of pixels, which include 3840 numbers of first pixels and 256 numbers of second pixels. Any two adjacent second pixels of the 256 numbers of second pixels are spaced apart by 15 numbers of first pixels of the 3840 numbers of first pixels. Optionally, the j-th second target pixel set of the 256 numbers of second target pixel sets includes C numbers of pixels. The first pixel in the C numbers of pixels in the j-th second target pixel set is a z-th pixel in a respective one of the M numbers of first pixel groups (e.g., a z-th pixel in the first pixel group S1 as shown in FIG. 2B). Optionally, $$z = \frac{j \times q}{q - n} - v - j - 1,$$

v is a constant.

In one example, the display apparatus determines 256 numbers of second target pixel sets for the first pixel group S1. The $1^{st}$ second target pixel set of the 256 numbers of second target pixel sets corresponds to a $1^{st}$ second pixel in of 256 numbers of second pixels in the second pixel group S2. The 1$^{st}$ second target pixel set includes C numbers of adjacent pixels in the first pixel group S1. The C numbers of adjacent pixels in the first pixel group S1 are respectively the z-th pixel, the (z+1)-th pixel, . . . , the (z+C-2)-th pixel, and the (z+C-1)-th pixel of the first pixel group S1. Optionally, z=13 when v=3.

In some embodiments, the method includes assigning the Q numbers of pixels values respectively to the Q numbers of first pixel sets for each respective one of the M numbers of first pixel groups. For example, the display apparatus assigns a pixel value to a q-th first pixel set of the Q numbers of first pixel sets, 1≤q≤Q. A pixel in a corresponding second pixel group of the M numbers of second pixel groups (e.g., a pixel in the second pixel group S2) is referred to as a designated pixel, the designated pixel corresponding to the q-th first pixel set of the Q numbers of first pixel sets. First, the display apparatus determines a sequential number k for the designated pixel in the corresponding second pixel group of the M numbers of second pixel groups, according to an arrangement order in the corresponding second pixel group of the M numbers of second pixel groups of pixels respectively corresponding to the Q numbers of first pixel sets.

As discussed above, for each respective one of the M numbers of first pixel groups, the display apparatus determines Q numbers of first pixel sets. The Q numbers of first pixel sets respectively correspond to the Q numbers of pixels in the corresponding second pixel group of the M numbers of second pixel groups, e.g., in a one-to-one correspondence relationship. In one example, the display apparatus determines 4096 numbers of first pixel sets. The 4096 first pixel sets respectively correspond to 4096 numbers of pixels in the second pixel group S2, e.g., in a one-to-one correspondence relationship.

Second, based on the sequential number k of the designated pixel in the corresponding second pixel group of the M numbers of second pixel groups, the display apparatus determines a reference relative distance bk corresponding to the designated pixel. Optionally, the reference relative distance bk can be determined according to Equation $$bk = b1 - \frac{\left(k \bmod \frac{q}{q-n} - 1\right) \times (q-n) \times r}{q},$$

wherein b1 stands for a reference relative distance of a reference pixel; the reference pixel is a pixel in the corresponding second pixel group of the M numbers of second pixel groups that is arranged before the designated pixel (e.g., having a smaller sequential number) and is spaced apart from the designated pixel by $$k \bmod \frac{q}{q-n} - 2$$

numbers of pixels; mod stands for a remainder operator; and r stands for a pitch of the N numbers of pixels of a corresponding one of the M numbers of first pixel groups along the second direction. Optionally, b1 can be an assigned value.

In one example, the display apparatus determines 4096 numbers of first pixel sets for the first pixel group S1. The second pixel group S2 includes 4096 numbers of pixels. In one example, the designated pixel has a sequential number k=19. The designated pixel has a reference relative distance $$b19 = b1 - \frac{2}{16}r,$$

wherein b1 stands for a reference relative distance of a reference pixel; the reference pixel is a pixel in the second pixel group S2 that is arranged before the designated pixel (e.g., having a smaller sequential number) and is spaced apart from the designated pixel by one pixel, i.e., the reference pixel has a sequential number k=17 according to the arrangement order of pixels in the second pixel group S2.

In some embodiments, the reference relative distance corresponding to an n-th first pixel of N numbers of first pixels (1≤n≤N) in the corresponding one of the M numbers of second pixel groups stands for a reference relative distance between the n-th first pixel and a 2$^{nd}$ pixel in an n-th first target pixel set of the N numbers of first target pixel sets (1≤n≤N) in a corresponding one of the M numbers of first pixel groups, the n-th first target pixel set of the N numbers of first target pixel sets corresponding to the n-th first pixel of N numbers of first pixels in the corresponding one of the M numbers of second pixel groups.

Figure 2C:
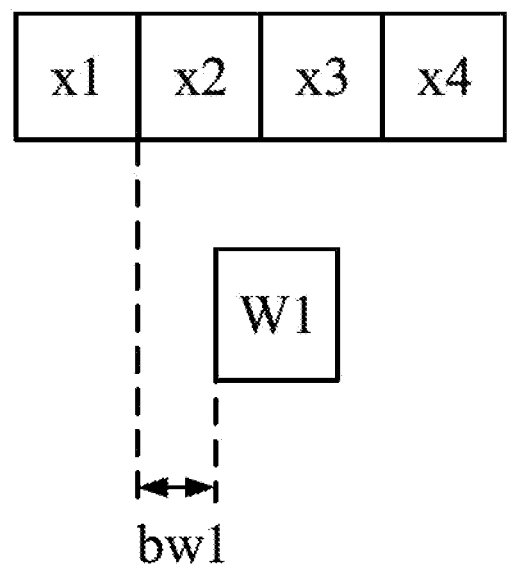
FIG. 2C illustrates a correspondence relationship between a first pixel in an N numbers of first pixels in one of the M numbers of second pixel groups and pixels in a corresponding one of an N numbers of first target pixel sets in some embodiments according to the present disclosure.

FIG. 2C illustrates a correspondence relationship between a first pixel in an N numbers of first pixels in a one of the M numbers of second pixel groups and pixels in a corresponding one of an N numbers of first target pixel sets in some embodiments according to the present disclosure. Referring to FIG. 2C, a first pixel W1 of N numbers of first pixels in the one of the M numbers of second pixel groups corresponds to a first target pixel set of the N numbers of first target pixel sets in the respective one of the M numbers of first pixel groups. The first target pixel set of the N numbers of first target pixel sets includes adjacent pixels x1, x2, x3, and x4. The reference relative distance bw1 corresponding to the first pixel W1 stands for a reference relative distance between the first pixel W1 and the pixel x2.

In some embodiments, the reference relative distance corresponding to a m-th second pixel of (Q-N) numbers of second pixels (1≤m≤S(Q-N)) in the corresponding one of the M numbers of second pixel groups stands for a reference relative distance between the m-th second pixel of (Q-N) numbers of second pixels in the corresponding one of the M numbers of second pixel groups and a 3 pixel in a m-th second target pixel set of the (Q-N) numbers of second target pixel sets (1≤m≤(Q-N)) in a corresponding one of the M numbers of first pixel groups, the m-th second pixel of (Q-N) numbers of second pixels in the corresponding one of the M numbers of second pixel groups corresponding to the m-th second pixel of (Q-N) numbers of second pixels in the corresponding one of the M numbers of second pixel groups.

Figure 2D:
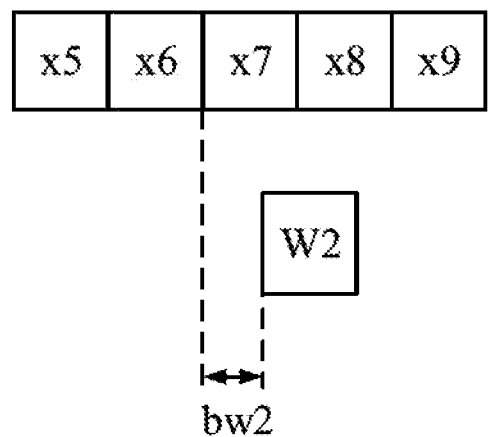
FIG. 2D illustrates a correspondence relationship between a second pixel in a (Q–N) numbers of second pixels in one of the M numbers of second pixel groups and pixels in a corresponding one of a (Q–N) numbers of second target pixel sets in some embodiments according to the present disclosure.

FIG. 2D illustrates a correspondence relationship between a second pixel in a (Q-N) numbers of second pixels in one of the M numbers of second pixel groups and pixels in a corresponding one of a (Q-N) numbers of second target pixel sets in some embodiments according to the present disclosure. Referring to FIG. 2l), a second pixel W2 of (Q-N) numbers of second pixels in the one of the M numbers of second pixel groups corresponds to a second target pixel set of the (Q-N) numbers of second target pixel sets in a corresponding one of the M numbers of first pixel groups. The second target pixel set of the (Q-N) numbers of second target pixel sets includes adjacent pixels x5, x6, x7, x8, and x9. The reference relative distance bw2 corresponding to the second pixel W2 stands for a reference relative distance between the second pixel W2 and the pixel x7.

Based on the reference relative distance bk, the display apparatus then determines relative distances respectively between the designated pixel and all pixels in the one of the Q numbers of first pixel sets corresponding to the designated pixel (e.g., all pixels in the q-th first pixel set corresponding to the designated pixel).

Referring to FIG. 2C, a relative distance between the first pixel W1 and the pixel x1 is L1=r+bw1; a relative distance between the first pixel W1 and the pixel x2 is L2=bw1; a relative distance between the first pixel W1 and the pixel x3 is L3=r−bw1; and a relative distance between the first pixel W1 and the pixel x4 is L4=2r−bw1.

Referring to FIG. 2D, a relative distance between the second pixel W2 and the pixel x5 is L5=2r+bw2; a relative distance between the second pixel W2 and the pixel x6 is L6=r+bw2; a relative distance between the second pixel W2 and the pixel x7 is L7=bw2; a relative distance between the second pixel W2 and the pixel x8 is L8=r−bw2; and a relative distance between the second pixel W2 and the pixel x9 is L9=2r−bw2.

In some embodiments, the method further includes determining the correlation coefficients respectively for the pixels in the q-th first pixel set of the Q numbers of first pixel sets based on the relative distances respectively between the designated pixel and all pixels in the q-th first pixel set corresponding to the designated pixel. The correlation coefficient corresponding to a pixel d in the q-th first pixel set of the Q numbers of first pixel sets represents a degree of correlation between the pixel d and the designated pixel.

In some embodiments, for a pixel d in the q-th first pixel set of the Q numbers of first pixel sets, the correlation coefficient can be calculated based on Equation $$\rho = \alpha \times \left(1 - \frac{Lk}{L}\right),$$

wherein $\rho$ stands for the correlation coefficient for the pixel d; $\alpha$ stands for a weight corresponding to the pixel d, a can bean assigned value; Lk stands for a relative distance between the pixel d and the designated pixel; and L stands for a sum of relative distances between the designated pixel and all pixels in the q-th first pixel set of the Q numbers of first pixel sets.

In one example, the q-th first pixel set of the Q numbers of first pixel sets is a first target pixel set as shown in FIG. 2C. The q-th first pixel set includes adjacent pixels x1, x2, x3, and x4 in the first pixel group S1. A correlation coefficient for pixel x1 can be determined based on Equation $$\rho_1 = \alpha_1 \times \left(1 - \frac{L1}{L}\right),$$

a correlation coefficient for pixel x2 can be determined based on a Equation $$\rho_2 = \alpha_2 \times \left(1 - \frac{L2}{L}\right),$$

a correlation coefficient for pixel x3 can be determined based on Equation $$\rho_3 = a_3 \times \left(1 - \frac{L3}{L}\right),$$

and a correlation coefficient for pixel x4 can be determined based on Equation $$\rho_4 = a_4 \times \left(1 - \frac{L4}{L}\right);$$

wherein $$\alpha_1 = \alpha_4 = \frac{1}{3r} \times \frac{1}{2(\gamma+1)}, \alpha_3 = \alpha_2 = \frac{1}{3r} \times \frac{\gamma}{2(\gamma+1)},$$

L=L1+L2+L3+L4, and $\gamma$ can be an assigned value.

In another example, the m-th second target pixel set of the (Q−N) numbers of second target pixel sets is a second target pixel set as shown in FIG. 2D. The m-th second target pixel set includes adjacent pixels x5, x6, x7, x8, and x9 in the first pixel group S1. A correlation coefficient for pixel x5 can be determined based on Equation $$\rho_5 = \alpha_5 \times \left(1 - \frac{L5}{L}\right),$$

a correlation coefficient for pixel x6 can be determined based on Equation $$\rho_6 = \alpha_6 \times \left(1 - \frac{L6}{L}\right),$$

a correlation coefficient for pixel x7 can be determined based on Equation $$\rho_7 = \alpha_7 \times \left(1 - \frac{L7}{L}\right),$$

a correlation coefficient for pixel x8 can be determined based on Equation $$\rho_8 = \alpha_8 \times \left(1 - \frac{L8}{L}\right),$$

and a correlation coefficient for pixel x9 can be determined based on Equation $$\rho_9 = \alpha_9 \times \left(1 - \frac{L9}{L}\right);$$

wherein $$\alpha_5 = \alpha_9 = \frac{1}{4r} \times \frac{1}{2(\beta_1 + 2\beta_2 + 2)},$$

$$\alpha_6 = \alpha_8 = \frac{1}{4r} \times \frac{\beta_2}{2(\beta_1 + 2\beta_2 + 2)}, \alpha_7 = \frac{1}{4r} \times \frac{\beta_1}{2(\beta_1 + 2\beta_2 + 2)},$$

L=L5+L6+L7+L8+L9, $\beta_1$ and $\beta_2$ can be assigned values.

In some embodiments, the method further includes assigning the Q numbers of pixels values respectively to the Q numbers of first pixel sets for each respective one of the M numbers of first pixel groups based on the correlation coefficients and the pixel values of all pixels in the respective one of the Q numbers of first pixel sets. For example, the display apparatus assigns a pixel value to the q-th first pixel set of the Q numbers of first pixel sets based on the pixel values and correlation coefficients of all pixels in the q-th first pixel set. Optionally, the pixel value can be assigned based on Equation $$T = \sum_{i=1}^{k} \frac{\rho_i}{\rho_{sum}} t_i;$$

wherein T stands for the pixel value assigned to the q-th first pixel set, $\rho_i$ stands for a correlation coefficient of a i-th pixel in the q-th first pixel set, $\rho_{sum}$ stands for a sum of all correlation coefficients of all pixels in the q-th first pixel set, r, stands for a pixel value of the i-th pixel in the q-th first pixel set, and h stands for a total number of pixels in the q-th first pixel set.

In some embodiments, the method further includes performing a fixed-point processing on the Q numbers of pixels values respectively assigned to the Q numbers of first pixel sets, e.g., performing a fixed-point processing on the pixel value assigned to the q-th first pixel set of the Q numbers of first pixel sets.

In some embodiments, the display apparatus processes the frame of video using Field-Programmable Gate Array (FPGA). Optionally, the display apparatus uses the Field-Programmable Gate Array to perform a fixed-point processing on the Q numbers of pixels values respectively assigned to the Q numbers of first pixel sets.

In some embodiments, the fixed-point processing includes a transformation on the pixel value assigned to the q-th first pixel set of the Q numbers of first pixel sets. Optionally, the transformation is performed according to Equation $$T = \frac{H}{2^n},$$

wherein T stands for the pixel value assigned to the q-th first pixel set, and n is a positive integer equal to or greater than 1.

In some embodiments, the method further includes generating M numbers of second pixel groups respectively for the M numbers of first pixel groups, each of the M numbers of second pixel groups including Q numbers of pixels. Each of the M numbers of second pixel groups includes Q numbers of pixels respectively corresponding to the Q numbers of first pixel sets (e.g., in a one-to-one correspondence relationship). Pixel values of the Q numbers of pixels respectively equal to the Q numbers of pixels values respectively assigned to the Q numbers of first pixel sets for a respective one of the M numbers of first pixel groups.

In some embodiments, the method further includes obtaining a first processed frame of video including the M numbers of second pixel groups along the first direction. A sequential number of an i-th second pixel group of the M numbers of second pixel groups according to an arrangement order of pixel groups in the M numbers of second pixel groups is the same as a sequential number of an i-th first pixel group of the M numbers of first pixel groups according to an arrangement order of pixel groups in the M numbers of first pixel groups, 1≤i≤M, the i-th second pixel group of the M numbers of second pixel groups corresponding to the i-th first pixel group of the M numbers of first pixel groups.

The first processed frame of video has an increased resolution along the second direction (e.g., increased from N to Q, optionally Q being the display resolution of a display apparatus along the second direction). Accordingly, the first processed frame of video has a resolution along the second direction same as the display resolution along the second direction of the display apparatus, enhancing display quality.

In some embodiments, the first processed frame of video includes Q number of third pixel groups along the second direction, each of the Q numbers of third pixel groups including M numbers of pixels along the first direction.

In some embodiments, when a discrepancy exists between the display resolution P of the display apparatus along the first direction and the video resolution M along the first direction of the video to be played, and particularly when the display resolution P along the first direction is greater than the video resolution M along the first direction, and optionally when the display resolution P along the first direction is a non-integer multiple of the video resolution M along the first direction, the display apparatus processes the frame of video to render a processed frame of video having a resolution along the first direction matching with (e.g., same as) the display resolution P along the first direction of the display apparatus, thereby enhancing display quality.

In some embodiments, the display apparatus further processes the first processed frame of video to obtain a second processed frame of video. In some embodiments, the method further includes determining P numbers of second pixel sets for each respective one of the Q numbers of third pixel groups, each of the P numbers of second pixel sets including a plurality of adjacent pixels in a respective one of the Q numbers of third pixel groups, P being a positive integer, P>M, and P is a non-integer multiple of M; assigning P numbers of pixels values respectively for the P numbers of second pixel sets for each respective one of the Q numbers of third pixel groups, each of the P numbers of pixel values being assigned based on pixel values of all pixels in a respective one of the P numbers of second pixel sets; generating Q numbers of fourth pixel groups respectively for the Q numbers of third pixel groups, each of the Q numbers of fourth pixel groups including P numbers of pixels, pixel values of the P numbers of pixels respectively equal to the P numbers of pixels values respectively for the P numbers of second pixel sets for a respective one of the Q numbers of third pixel groups; and obtaining a second processed frame of video including the Q numbers of fourth pixel groups along the second direction. A sequential number of an i-th fourth pixel group of the Q numbers of fourth pixel groups according to an arrangement order of pixel groups in the Q numbers of fourth pixel groups is the same as a sequential number of an i-th third pixel group of the Q numbers of third pixel groups according to an arrangement order of pixel groups in the Q numbers of third pixel groups, 1≤i≤Q, the i-th fourth pixel group of the Q numbers of fourth pixel groups corresponding to the i-th third pixel group of the Q numbers of third pixel groups.

The steps of obtaining the second processed frame of video can be performed in a manner similar to those for obtaining the first processed frame of video.

The present method processes an original frame of video having a M×N resolution, e.g., having M numbers of first pixel groups along the first direction, each of the M numbers of first pixel groups including N numbers of pixels along the second direction. For each respective one of the M numbers of first pixel groups, the present method determines Q numbers of first pixel sets, assigning Q numbers of pixels values respectively to the Q numbers of first pixel sets, and generates M numbers of second pixel groups respectively for the M numbers of first pixel groups, each of the M numbers of second pixel groups including Q numbers of pixels, pixel values of the Q numbers of pixels, thereby obtaining a processed frame of video including the M numbers of second pixel groups along the first direction. The processed frame of video has an increased resolution along the second direction (e.g., increased from N to Q, optionally Q being the display resolution of a display apparatus along the second direction). Accordingly, the present method is capable of converting an original video into a processed video having a resolution along the second direction same as the display resolution along the second direction, significantly enhancing display quality in the display apparatus.

In another aspect, the present disclosure provides an apparatus for processing video data. In some embodiments, the apparatus for processing video data includes a memory and one or more processors. The memory and the one or more processors are connected with each other. The memory stores computer-executable instructions for controlling the one or more processors to obtain a frame of video including M numbers of first pixel groups along a first direction, each of the M numbers of first pixel groups including N numbers of pixels along a second direction, M and N being positive integers; determine Q numbers of first pixel sets for each respective one of the M numbers of first pixel groups, each of the Q numbers of first pixel sets including a plurality of adjacent pixels in a respective one of the M numbers of first pixel groups, Q being a positive integer; assign Q numbers of pixels values respectively for the Q numbers of first pixel sets for each respective one of the M numbers of first pixel groups, each of the Q numbers of pixel values being assigned based on pixel values of all pixels in a respective one of the Q numbers of first pixel sets; generate M numbers of second pixel groups respectively for the M numbers of first pixel groups, each of the M numbers of second pixel groups including Q numbers of pixels, pixel values of the Q numbers of pixels respectively equal to the Q numbers of pixels values respectively for the Q numbers of first pixel sets for a respective one of the M numbers of first pixel groups; and obtain a processed frame of video including the M numbers of second pixel groups along the first direction. Optionally, Q>N, and Q is a non-integer multiple of N.

In some embodiments, the processed frame of video includes Q number of third pixel groups along the second direction, each of the Q numbers of third pixel groups including M numbers of pixels along the first direction. Optionally, the memory further stores computer-executable instructions for controlling the one or more processors to determine P numbers of second pixel sets for each respective one of the Q numbers of third pixel groups, each of the P numbers of second pixel sets including a plurality of adjacent pixels in a respective one of the Q numbers of third pixel groups, P being a positive integer. P>M, and P is a non-integer multiple of M; assign P numbers of pixels values respectively for the P numbers of second pixel sets for each respective one of the Q numbers of third pixel groups, each of the P numbers of pixel values being assigned based on pixel values of all pixels in a respective one of the P numbers of second pixel sets; generate Q numbers of fourth pixel groups respectively for the Q numbers of third pixel groups, each of the Q numbers of fourth pixel groups including P numbers of pixels, pixel values of the P numbers of pixels respectively equal to the P numbers of pixels values respectively for the P numbers of second pixel sets for a respective one of the Q numbers of third pixel groups; and obtain the processed frame of video including the Q numbers of fourth pixel groups along the second direction.

In some embodiments, the memory further stores computer-executable instructions for controlling the one or more processors to determine N numbers of first target pixel sets and (Q-N) numbers of second target pixel sets for each respective one of the M numbers of first pixel groups, thereby determining the Q numbers of first pixel sets for each respective one of the M numbers of first pixel groups. Each of the M numbers of second pixel groups includes N numbers of first pixels and (Q-N) numbers of second pixels, any two adjacent second pixels of the (Q-N) numbers of second pixels being spaced apart by a same total number of first pixels of the N numbers of first pixels. The N numbers of first target pixel sets respectively correspond to the N numbers of first pixels in a respective one of the M numbers of second pixel groups. The (Q-N) numbers second target pixel sets respectively correspond to the (Q-N) numbers of second pixels in the respective one of the M numbers of second pixel groups.

Optionally, an i-th first target pixel set of the N numbers of first target pixel sets corresponds to an i-th first pixel of the N numbers of first pixels in the respective one of the M numbers of second pixel groups, 1≤i≤N. Optionally, a first pixel in the i-th first target pixel set of the N numbers of first target pixel sets is an i-th pixel in a respective one of the M numbers of first pixel groups.

Optionally, a j-th second target pixel set of the (Q-N) numbers of second target pixel sets corresponds to a j-th second pixel of the (Q-N) numbers of second pixels in the respective one of the M numbers of second pixel groups, 1≤j≤(Q-N). Optionally, a first pixel in the j-th second target pixel set of the (Q-N) numbers of second target pixel sets is a z-th pixel in a respective one of the M numbers of first pixel groups. Optionally, $$z = \frac{j \times q}{q-n} - v - j - 1,$$

v is a constant.

In some embodiments, the memory further stores computer-executable instructions for controlling the one or more processors to add A numbers of newly added pixel into each respective one of the M numbers of first pixel groups, A≥1; and determine the Q numbers of first pixel sets for each respective one of the M numbers of first pixel groups having the at least one newly added pixel. Optionally, a pixel value of each of the at least one newly added pixel is equal to a pixel value of a pixel in a respective one of the M numbers of first pixel groups. Optionally, A=B-1, B is a total number of pixels in each of the N numbers of first target pixel sets.

In some embodiments, the memory further stores computer-executable instructions for controlling the one or more processors to determine correlation coefficients respectively for pixels in each of the Q numbers of first pixel sets for each respective one of the M numbers of first pixel groups; and assign the Q numbers of pixels values respectively for the Q numbers of first pixel sets for each respective one of the M numbers of first pixel groups based on the correlation coefficients and the pixel values of all pixels in the respective one of the Q numbers of first pixel sets. Optionally, each of the correlation coefficients represents a degree of correlation between a respective pixel in the respective one of the Q numbers of first pixel sets and a respective one of the Q numbers of pixels in a respective one of the M numbers of second pixel groups.

In some embodiments, the memory further stores computer-executable instructions for controlling the one or more processors to determine relative distances respectively between the respective one of the Q numbers of pixels in the respective one of the M numbers of second pixel groups and pixels in the respective one of the Q numbers of first pixel sets; and determine the correlation coefficients respectively for the pixels in each of the Q numbers of first pixel sets for each respective one of the M numbers of first pixel groups based on the relative distances.

Figure 3:
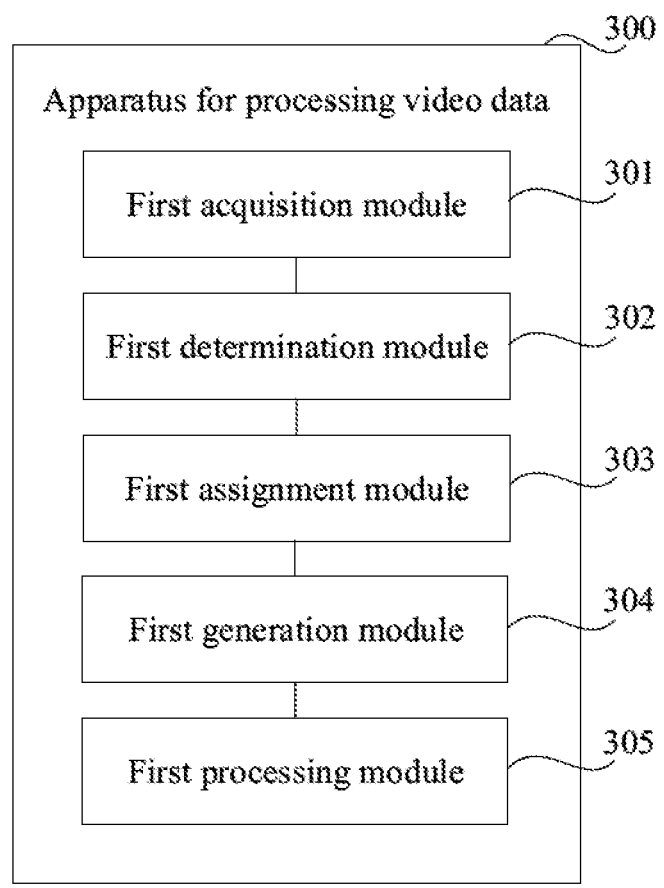
FIG. 3 is a schematic diagram illustrating the structure of an apparatus for processing video data in some embodiments according to the present disclosure.

FIG. 3 is a schematic diagram illustrating the structure of an apparatus for processing video data in some embodiments according to the present disclosure. Referring to FIG. 3, the apparatus for processing video data 300 in some embodiments includes a first acquisition module 301, a first determination module 302, a first assignment module 303, a first generation module 304, and a first processing module 305. The first acquisition module 301 is configured to obtain a frame of video including M numbers of first pixel groups along a first direction, each of the M numbers of first pixel groups including N numbers of pixels along a second direction, M and N being positive integers. The first direction and the second direction intersect with each other. The first determination module 302 is configured to determine Q numbers of first pixel sets for each respective one of the M numbers of first pixel groups, each of the Q numbers of first pixel sets including a plurality of adjacent pixels in a respective one of the M numbers of first pixel groups, Q being a positive integer. The first assignment module 303 is configured to assign Q numbers of pixels values respectively for the Q numbers of first pixel sets for each respective one of the M numbers of first pixel groups, each of the Q numbers of pixel values being assigned based on pixel values of all pixels in a respective one of the Q numbers of first pixel sets. The first generation nodule 304 is configured to generate M numbers of second pixel groups respectively for the M numbers of first pixel groups, each of the M numbers of second pixel groups including Q numbers of pixels, pixel values of the Q numbers of pixels respectively equal to the Q numbers of pixels values respectively for the Q numbers of first pixel sets for a respective one of the M numbers of first pixel groups. The first processing module 305 is configured to obtain a first processed frame of video including the M numbers of second pixel groups along the first direction.

In some embodiments, the first determination module 302 is further configured to determine N numbers of first target pixel sets and (Q−N) numbers of second target pixel sets for each respective one of the M numbers of first pixel groups, thereby determining the Q numbers of first pixel sets for each respective one of the M numbers of first pixel groups. Each of the M numbers of second pixel groups includes N numbers of first pixels and (Q−N) numbers of second pixels, any two adjacent second pixels of the (Q−N) numbers of second pixels being spaced apart by a same total number of first pixels of the N numbers of first pixels. The N numbers of first target pixel sets respectively correspond to the N numbers of first pixels in a respective one of the M numbers of second pixel groups. The (Q−N) numbers second target pixel sets respectively correspond to the (Q−N) numbers of second pixels in the respective one of the M numbers of second pixel groups.

In some embodiments, the first assignment module 303 is further configured to determine correlation coefficients respectively for pixels in each of the Q numbers of first pixel sets for each respective one of the M numbers of first pixel groups; and assign the Q numbers of pixels values respectively for the Q numbers of first pixel sets for each respective one of the M numbers of first pixel groups based on the correlation coefficients and the pixel values of all pixels in the respective one of the Q numbers of first pixel sets. Each of the correlation coefficients represents a degree of correlation between a respective pixel in the respective one of the Q numbers of first pixel sets and a respective one of the Q numbers of pixels in a respective one of the M numbers of second pixel groups.

Figure 4:
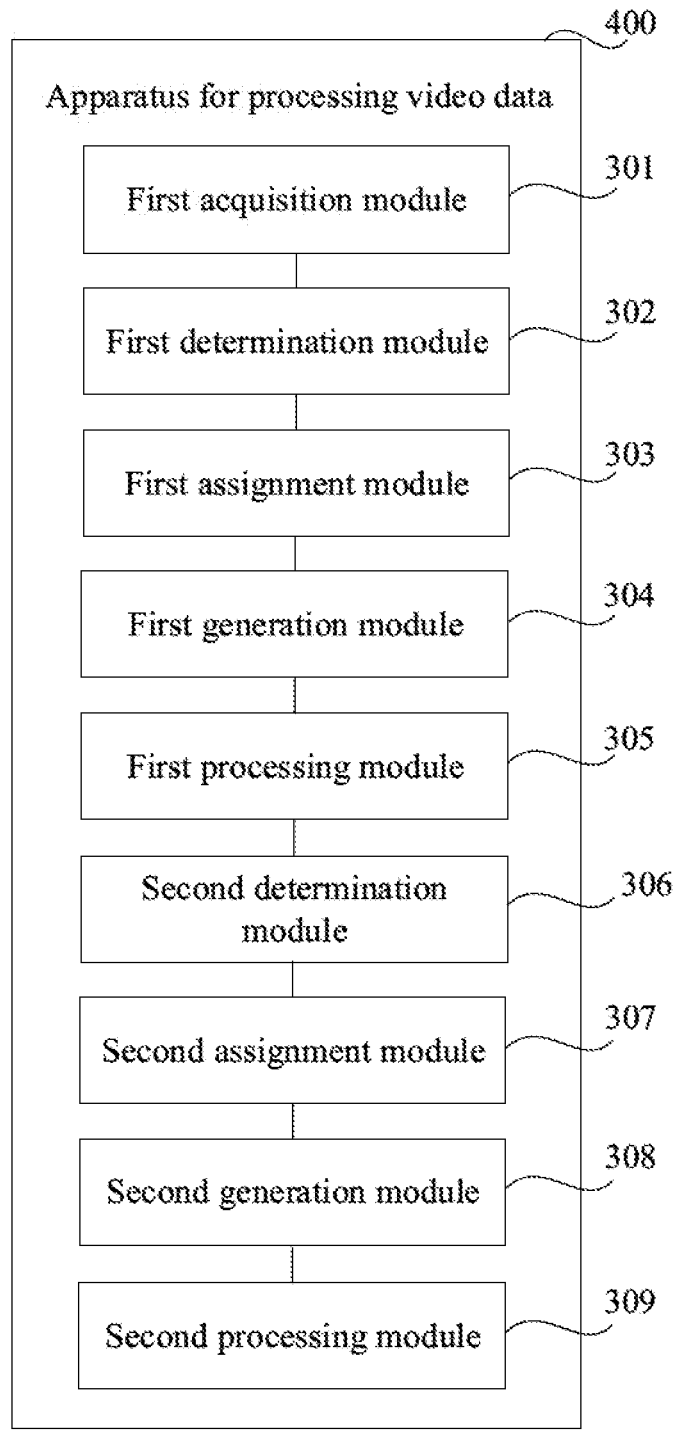
FIG. 4 is a schematic diagram illustrating the structure of an apparatus for processing video data in some embodiments according to the present disclosure.

FIG. 4 is a schematic diagram illustrating the structure of an apparatus for processing video data in some embodiments according to the present disclosure. Referring to FIG. 4, the apparatus for processing video data 400 in some embodiments includes a first acquisition module 301, a first determination module 302, a first assignment module 303, a first generation module 304, a first processing module 305, a second determination module 306, a second assignment module 307, a second generation module 308, and a second processing module 309.

In some embodiments, the first processed frame of video includes Q number of third pixel groups along the second direction, each of the Q numbers of third pixel groups including M numbers of pixels along the first direction. The second determination module 306 is configured to determine P numbers of second pixel sets for each respective one of the Q numbers of third pixel groups, each of the P numbers of second pixel sets including a plurality of adjacent pixels in a respective one of the Q numbers of third pixel groups, P being a positive integer, P>M, and P is a non-integer multiple of M. The second assignment module 307 is configured to assign P numbers of pixels values respectively for the P numbers of second pixel sets for each respective one of the Q numbers of third pixel groups, each of the P numbers of pixel values being assigned based on pixel values of all pixels in a respective one of the P numbers of second pixel sets. The second generation module 308 is configured to each of the Q numbers of fourth pixel groups including P numbers of pixels, pixel values of the P numbers of pixels respectively equal to the P numbers of pixels values respectively for the P numbers of second pixel sets for a respective one of the Q numbers of third pixel groups. The second processing module 309 is configured to obtain a second processed frame of video including the Q numbers of fourth pixel groups along the second direction.

The present apparatus processes an original frame of video having a M×N resolution, e.g., having M numbers of first pixel groups along the first direction, each of the M numbers of first pixel groups including N numbers of pixels along the second direction. For each respective one of the M numbers of first pixel groups, the present apparatus determines Q numbers of first pixel sets, assigning Q numbers of pixels values respectively to the Q numbers of first pixel sets, and generates M numbers of second pixel groups respectively for the M numbers of first pixel groups, each of the M numbers of second pixel groups including Q numbers of pixels, pixel values of the Q numbers of pixels, thereby obtaining a processed frame of video including the M numbers of second pixel groups along the first direction. The processed frame of video has an increased resolution along the second direction (e.g., increased from N to Q, optionally Q being the display resolution of a display apparatus along the second direction). Accordingly, the present apparatus is capable of converting an original video into a processed video having a resolution along the second direction same as the display resolution along the second direction, significantly enhancing display quality in the display apparatus.

Figure 5:
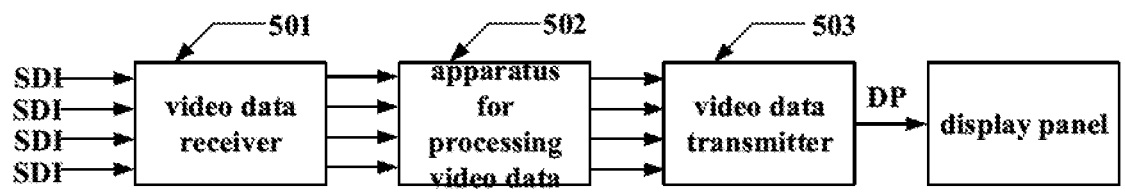
FIG. 5 is a schematic diagram illustrating the structure of a display apparatus in some embodiments according to the present disclosure.

In another aspect, the present disclosure further provides a display apparatus. In some embodiments, the display apparatus includes an apparatus for processing video data described herein. FIG. 5 is a schematic diagram illustrating the structure of a display apparatus in some embodiments according to the present disclosure. Referring to FIG. 5, the display apparatus in some embodiments includes a video data receiver 501, an apparatus for processing video data 502, a video data transmitter 503, and a display panel 504. The video data receiver 501, the apparatus for processing video data 502, the video data transmitter 503, and the display panel 504 are sequentially connected.

The video data receiver 501 is configured to receive a video data, e.g., a frame of video. The video data receiver 501 in some embodiments is configured to receive the frame of video through a plurality of serial digital interfaces (SDI), e.g., four SDIs in FIG. 5. Further, the video data receiver 501 in some embodiments is configured to transmit the frame of video to the apparatus for processing video data 502 via a plurality of interfaces (e.g., four interfaces as shown in FIG. 5). For a frame of video having a resolution of 3840*2160, the video data receiver 501 can receive the frame of video via four SDIs. For example, each quarter portion of the frame of video is transmitted from the video data receiver 501 to the apparatus for processing video data 502 via one of the four SDIs. Each quarter portion of the frame of video has a resolution of 960*2160. The video data receiver 501 transmits four quarter portions of the frame of video to the apparatus for processing video data 502 via four SDIs.

The video data transmitter 503 is configured to transmit a processed frame of video from the apparatus for processing video data 502 to the display panel 504. In one example, the video data transmitter 503 is configured to transmit the processed frame of video from the apparatus for processing video data 502 to the display panel 504 via a display port. The display panel 504 is configured to display the processed frame of video.

The apparatus for processing video data 502 is configured to process the frame of video, and configured to transmit the processed frame of video to the video data transmitter 503 via a plurality of interfaces, e.g., four interfaces. In some embodiments, the apparatus for processing video data 502 is configured to obtain a frame of video including M numbers of first pixel groups along a first direction, each of the M numbers of first pixel groups including N numbers of pixels along a second direction, M and N being positive integers; determine Q numbers of first pixel sets for each respective one of the M numbers of first pixel groups, each of the Q numbers of first pixel sets including a plurality of adjacent pixels in a respective one of the M numbers of first pixel groups, Q being a positive integer; assign Q numbers of pixels values respectively for the Q numbers of first pixel sets for each respective one of the M numbers of first pixel groups, each of the Q numbers of pixel values being assigned based on pixel values of all pixels in a respective one of the Q numbers of first pixel sets; generate M numbers of second pixel groups respectively for the M numbers of first pixel groups, each of the M numbers of second pixel groups including Q numbers of pixels, pixel values of the Q numbers of pixels respectively equal to the Q numbers of pixels values respectively for the Q numbers of first pixel sets for a respective one of the M numbers of first pixel groups; and obtain a processed frame of video including the M numbers of second pixel groups along the first direction.

Figure 6:
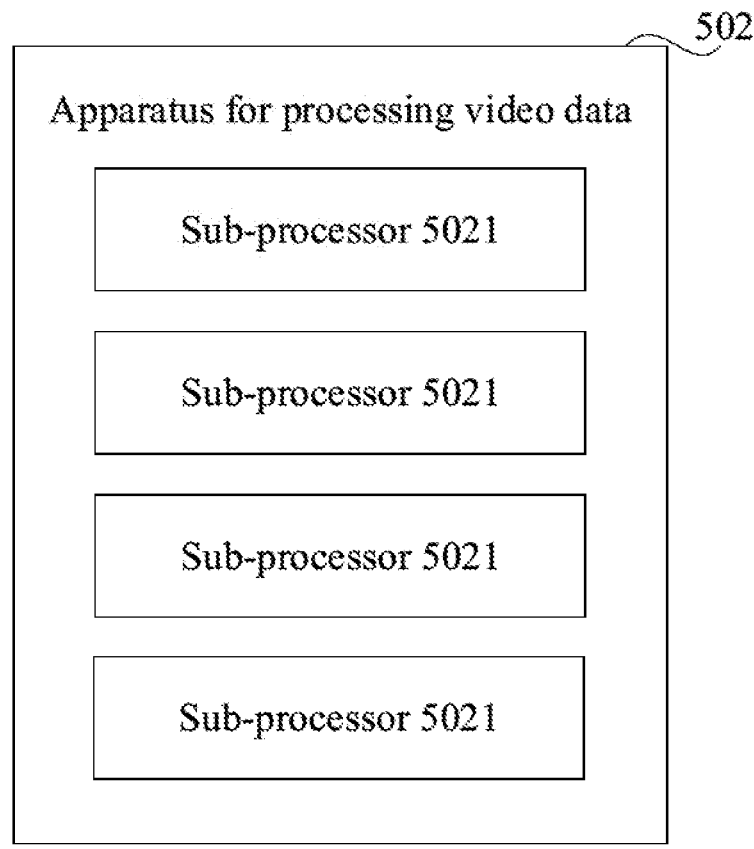
FIG. 6 is a schematic diagram illustrating the structure of an apparatus for processing video data in some embodiments according to the present disclosure.

FIG. 6 is a schematic diagram illustrating the structure of an apparatus for processing video data in some embodiments according to the present disclosure. Referring to IG. 6, the apparatus for processing video data 502 in some embodiments includes a plurality of sub-processors 5021, e.g., four sub-processors as shown in FIG. 6. Each of the plurality of sub-processors 5021 is configured to process a portion of the frame of video. In one example, the frame of video has a resolution of 3840*2160, and the apparatus for processing video data 502 includes four sub-processors, each of which is configured to process a quarter portion of the frame of video.

Figure 7:
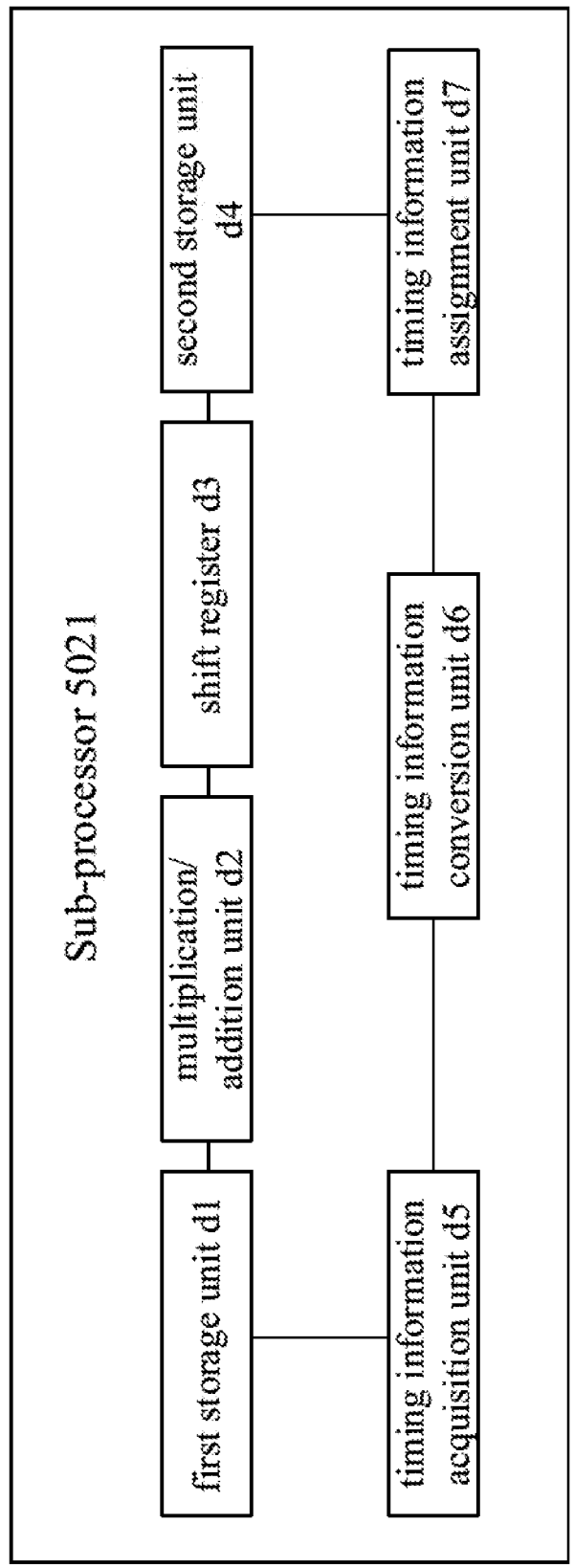
FIG. 7 is a schematic diagram illustrating the structure of a sub-processor in an apparatus for processing video data in some embodiments according to the present disclosure.

FIG. 7 is a schematic diagram illustrating the structure of a sub-processor in an apparatus for processing video data in some embodiments according to the present disclosure. Referring to FIG. 7, each of the plurality of sub-processors 5021 in some embodiments includes a first storage unit d1, a multiplication/addition unit d2, a shift register d3, a second storage unit d4, a timing information acquisition unit d5, a timing information conversion unit d6, and a timing information assignment unit d7. The first storage unit d1 is configured to store a portion of frame of video received from the video data receiver 501. The multiplication/addition unit d2 is configured to process the portion of frame of video to generate an initially processed portion of frame of video. The shift register d3 is configured to perform a fixed-point processing on the initially processed portion of frame of video, to generate a processed portion of fame of video. The second storage unit d4 is configured to store the processed portion of frame of video. The timing information acquisition unit d5 is configured to obtain timing information of the processed portion of frame of video. The timing information conversion unit d6 is configured to process the timing information of the processed portion of frame of video. The timing information assignment unit d7 is configured to assign the processed timing information to the processed portion of frame of video.

The present display apparatus processes an original frame of video having a M×N resolution, e.g., having M numbers of first pixel groups along the first direction, each of the M numbers of first pixel groups including N numbers of pixels along the second direction. For each respective one of the M numbers of first pixel groups, the present display apparatus determines Q numbers of first pixel sets, assigning Q numbers of pixels values respectively to the Q numbers of first pixel sets, and generates M numbers of second pixel groups respectively for the M numbers of first pixel groups, each of the M numbers of second pixel groups including Q numbers of pixels, pixel values of the Q numbers of pixels, thereby obtaining a processed frame of video including the M numbers of second pixel groups along the first direction. The processed frame of video has an increased resolution along the second direction (e.g., increased from N to Q, optionally Q being the display resolution of a display apparatus along the second direction). Accordingly, the present display apparatus is capable of converting an original video into a processed video having a resolution along the second direction same as the display resolution along the second direction, significantly enhancing display quality in the display apparatus.

In another aspect, the present disclosure provides a computer-program product having a non-transitory tangible computer-readable medium having computer-readable instructions thereon. In some embodiments, the computer-readable instructions being executable by a processor to cause the processor to perform obtaining a frame of video including M numbers of first pixel groups along a first direction, each of the M numbers of first pixel groups including N numbers of pixels along a second direction, M and N being positive integers; determining Q numbers of first pixel sets for each respective one of the M numbers of first pixel groups, each of the Q numbers of first pixel sets including a plurality of adjacent pixels in a respective one of the M numbers of first pixel groups, Q being a positive integer; assigning Q numbers of pixels values respectively for the Q numbers of first pixel sets for each respective one of the M numbers of first pixel groups, each of the Q numbers of pixel values being assigned based on pixel values of all pixels in a respective one of the Q numbers of first pixel sets; generating M numbers of second pixel groups respectively for the M numbers of first pixel groups, each of the M numbers of second pixel groups including Q numbers of pixels, pixel values of the Q numbers of pixels respectively equal to the Q numbers of pixels values respectively for the Q numbers of first pixel sets for a respective one of the M numbers of first pixel groups; and obtaining a processed frame of video including the M numbers of second pixel groups along the first direction. Optionally, Q>N, and Q is a non-integer multiple of N.

In some embodiments, the processed frame of video includes Q number of third pixel groups along the second direction, each of the Q numbers of third pixel groups including M numbers of pixels along the first direction. Optionally, the computer-readable instructions are executable by a processor to cause the processor to further perform determining P numbers of second pixel sets for each respective one of the Q numbers of third pixel groups, each of the P numbers of second pixel sets including a plurality of adjacent pixels in a respective one of the Q numbers of third pixel groups, P being a positive integer. P>M, and P is a non-integer multiple of M; assigning P numbers of pixels values respectively for the P numbers of second pixel sets for each respective one of the Q numbers of third pixel groups, each of the P numbers of pixel values being assigned based on pixel values of all pixels in a respective one of the P numbers of second pixel sets; generating Q numbers of fourth pixel groups respectively for the Q numbers of third pixel groups, each of the Q numbers of fourth pixel groups including P numbers of pixels, pixel values of the P numbers of pixels respectively equal to the P numbers of pixels values respectively for the P numbers of second pixel sets for a respective one of the Q numbers of third pixel groups; and obtaining the processed frame of video including the Q numbers of fourth pixel groups along the second direction.

In some embodiments, the computer-readable instructions are executable by a processor to cause the processor to further perform determining N numbers of first target pixel sets and (Q−N) numbers of second target pixel sets for each respective one of the M numbers of first pixel groups. Each of the M numbers of second pixel groups includes N numbers of first pixels and (Q−N) numbers of second pixels, any two adjacent second pixels of the (Q−N) numbers of second pixels being spaced apart by a same total number of first pixels of the N numbers of first pixels. The N numbers of first target pixel sets respectively correspond to the N numbers of first pixels in a respective one of the M numbers of second pixel groups. The (Q−N) numbers second target pixel sets respectively correspond to the (Q−N) numbers of second pixels in the respective one of the M numbers of second pixel groups. Optionally, an i-th first target pixel set of the N numbers of first target pixel sets corresponds to an i-th first pixel of the N numbers of first pixels in the respective one of the M numbers of second pixel groups, 1≤i≤N. Optionally, a first pixel in the i-th first target pixel set of the N numbers of first target pixel sets is an i-th pixel in a respective one of the M numbers of first pixel groups. Optionally, a j-th second target pixel set of the (Q−N) numbers of second target pixel sets corresponds to a j-th second pixel of the (Q−N) numbers of second pixels in the respective one of the M numbers of second pixel groups, 1≤j≤(Q−N). Optionally, a first pixel in the j-th second target pixel set of the (Q−N) numbers of second target pixel sets is a z-th pixel in a respective one of the M numbers of first pixel groups. Optionally, $$z = \frac{j \times q}{q-n} - v - j - 1,$$

v is a constant.

In some embodiments, the computer-readable instructions are executable by a processor to cause the processor to further perform adding A numbers of newly added pixel into each respective one of the M numbers of first pixel groups, A≥1; and determining the Q numbers of first pixel sets for each respective one of the M numbers of first pixel groups having the at least one newly added pixel. Optionally, a pixel value of each of the at least one newly added pixel is equal to a pixel value of a pixel in a respective one of the M numbers of first pixel groups. Optionally, A=B−1, B is a total number of pixels in each of the N numbers of first target pixel sets.

In some embodiments, the computer-readable instructions are executable by a processor to cause the processor to further perform determining correlation coefficients respectively for pixels in each of the Q numbers of first pixel sets for each respective one of the M numbers of first pixel groups; and assigning the Q numbers of pixels values respectively for the Q numbers of first pixel sets for each respective one of the M numbers of first pixel groups based on the correlation coefficients and the pixel values of all pixels in the respective one of the Q numbers of first pixel sets. Optionally, each of the correlation coefficients represents a degree of correlation between a respective pixel in the respective one of the Q numbers of first pixel sets and a respective one of the Q numbers of pixels in a respective one of the M numbers of second pixel groups.

In some embodiments, the computer-readable instructions are executable by a processor to cause the processor to further perform determining relative distances respectively between the respective one of the Q numbers of pixels in the respective one of the M numbers of second pixel groups and pixels in the respective one of the Q numbers of first pixel sets; and determining the correlation coefficients respectively for the pixels in each of the Q numbers of first pixel sets for each respective one of the M numbers of first pixel groups based on the relative distances.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of processing video data, comprising:
obtaining a frame of video comprising M numbers of first pixel groups along a first direction, each of the M numbers of first pixel groups comprising N numbers of pixels along a second direction, M and N being positive integers;
determining Q numbers of first pixel sets for each respective one of the M numbers of first pixel groups, each of the Q numbers of first pixel sets comprising a plurality of adjacent pixels in a respective one of the M numbers of first pixel groups, Q being a positive integer;
assigning Q numbers of pixels values respectively to the Q numbers of first pixel sets for each respective one of the M numbers of first pixel groups, each of the Q numbers of pixel values being assigned based on pixel values of all pixels in a respective one of the Q numbers of first pixel sets;
generating M numbers of second pixel groups respectively for the M numbers of first pixel groups, each of the M numbers of second pixel groups comprising Q numbers of pixels, pixel values of the Q numbers of pixels respectively equal to the Q numbers of pixels values respectively for the Q numbers of first pixel sets for a respective one of the M numbers of first pixel groups; and
obtaining a processed frame of video comprising the M numbers of second pixel groups along the first direction;
wherein assigning the Q numbers of pixels values respectively to the Q numbers of first pixel sets for each respective one of the M numbers of first pixel groups comprises:
determining correlation coefficients respectively for pixels in each of the Q numbers of first pixel sets for each respective one of the M numbers of first pixel groups; and
assigning the Q numbers of pixels values respectively to the Q numbers of first pixel sets for each respective one of the M numbers of first pixel groups based on the correlation coefficients and the pixel values of all pixels in the respective one of the Q numbers of first pixel sets;
wherein each of the correlation coefficients represents a degree of correlation between a respective pixel in the respective one of the Q numbers of first pixel sets and a respective one of the Q numbers of pixels in a respective one of the M numbers of second pixel groups.

2. The method of claim 1, wherein Q>N, and Q is a non-integer multiple of N.

3. The method of claim 1, wherein the processed frame of video comprises Q number of third pixel groups along the second direction, each of the Q numbers of third pixel groups comprising M numbers of pixels along the first direction;
the method further comprising:
determining P numbers of second pixel sets for each respective one of the Q numbers of third pixel groups, each of the P numbers of second pixel sets comprising a plurality of adjacent pixels in a respective one of the Q numbers of third pixel groups, P being a positive integer, P>M, and P is a non-integer multiple of M;
assigning P numbers of pixels values respectively to the P numbers of second pixel sets for each respective one of the Q numbers of third pixel groups, each of the P numbers of pixel values being assigned based on pixel values of all pixels in a respective one of the P numbers of second pixel sets;
generating Q numbers of fourth pixel groups respectively for the Q numbers of third pixel groups, each of the Q numbers of fourth pixel groups comprising P numbers of pixels, pixel values of the P numbers of pixels respectively equal to the P numbers of pixels values respectively for the P numbers of second pixel sets for a respective one of the Q numbers of third pixel groups; and
obtaining the processed frame of video comprising the Q numbers of fourth pixel groups along the second direction.

4. The method of claim 1, wherein determining the Q numbers of first pixel sets for each respective one of the M numbers of first pixel groups comprises:
determining N numbers of first target pixel sets and (Q−N) numbers of second target pixel sets for each respective one of the M numbers of first pixel groups, Q>N;
wherein each of the M numbers of second pixel groups comprises N numbers of first pixels and (Q−N) numbers of second pixels, any two adjacent second pixels of the (Q−N) numbers of second pixels being spaced apart by a same total number of first pixels of the N numbers of first pixels;
the N numbers of first target pixel sets respectively correspond to the N numbers of first pixels in a respective one of the M numbers of second pixel groups; and
the (Q−N) numbers second target pixel sets respectively correspond to the (Q−N) numbers of second pixels in the respective one of the M numbers of second pixel groups.

5. The method of claim 4, wherein an i-th first target pixel set of the N numbers of first target pixel sets corresponds to an i-th first pixel of the N numbers of first pixels in the respective one of the M numbers of second pixel groups, 1≤i≤N; and a first pixel in the i-th first target pixel set of the N numbers of first target pixel sets is an i-th pixel in a respective one of the M numbers of first pixel groups.

6. The method of claim 4, wherein a j-th second target pixel set of the (Q−N) numbers of second target pixel sets corresponds to a j-th second pixel of the (Q−N) numbers of second pixels in the respective one of the M numbers of second pixel groups, 1≤j≤(Q−N); and a first pixel in the j-th second target pixel set of the (Q−N) numbers of second target pixel sets is a z-th pixel in a respective one of the M numbers of first pixel groups; wherein $$z = \frac{j \times q}{q - n} - v - j - 1,$$

v is a constant;
1≤n≤N; and
1≤q≤Q.

7. The method of claim 4, wherein determining the Q numbers of first pixel sets for each respective one of the M numbers of first pixel groups comprises:

adding A numbers of newly added pixel into each respective one of the M numbers of first pixel groups, A≥1; and determining the Q numbers of first pixel sets for each respective one of the M numbers of first pixel groups having the at least one newly added pixel;

wherein a pixel value of each of the at least one newly added pixel is equal to a pixel value of a pixel in a respective one of the M numbers of first pixel groups; and A=B−1, B is a total number of pixels in each of the N numbers of first target pixel sets.

8. The method of claim 1, wherein determining the correlation coefficients respectively for the pixels in each of the Q numbers of first pixel sets for each respective one of the M numbers of first pixel groups comprises:

determining relative distances respectively between the respective one of the Q numbers of pixels in the respective one of the M numbers of second pixel groups and pixels in the respective one of the Q numbers of first pixel sets; and determining the correlation coefficients respectively for the pixels in each of the Q numbers of first pixel sets for each respective one of the M numbers of first pixel groups based on the relative distances.

9. An apparatus for processing video data, comprising
a memory; and
one or more processors;
wherein the memory and the one or more processors are connected with each other; and
the memory stores computer-executable instructions for controlling the one or more processors to:
obtain a frame of video comprising M numbers of first pixel groups along a first direction, each of the M numbers of first pixel groups comprising N numbers of pixels along a second direction, M and N being positive integers;
determine Q numbers of first pixel sets for each respective one of the M numbers of first pixel groups, each of the Q numbers of first pixel sets comprising a plurality of adjacent pixels in a respective one of the M numbers of first pixel groups, Q being a positive integer;

assign Q numbers of pixels values respectively to the Q numbers of first pixel sets for each respective one of the M numbers of first pixel groups, each of the Q numbers of pixel values being assigned based on pixel values of all pixels in a respective one of the Q numbers of first pixel sets;

generate M numbers of second pixel groups respectively for the M numbers of first pixel groups, each of the M numbers of second pixel groups comprising Q numbers of pixels, pixel values of the Q numbers of pixels respectively equal to the Q numbers of pixels values respectively for the Q numbers of first pixel sets for a respective one of the M numbers of first pixel groups; and obtain a processed frame of video comprising the M numbers of second pixel groups along the first direction;

wherein the memory further stores computer-executable instructions for controlling the one or more processors to:

determine correlation coefficients respectively for pixels in each of the Q numbers of first pixel sets for each respective one of the M numbers of first pixel groups; and assign the Q numbers of pixels values respectively to the Q numbers of first pixel sets for each respective one of the M numbers of first pixel groups based on the correlation coefficients and the pixel values of all pixels in the respective one of the Q numbers of first pixel sets;

wherein each of the correlation coefficients represents a degree of correlation between a respective pixel in the respective one of the Q numbers of first pixel sets and a respective one of the Q numbers of pixels in a respective one of the M numbers of second pixel groups.

10. The apparatus of claim 9, wherein Q>N, and Q is a non-integer multiple of N.

11. The apparatus of claim 9, wherein the processed frame of video comprises Q number of third pixel groups along the second direction, each of the Q numbers of third pixel groups comprising M numbers of pixels along the first direction;

the memory further stores computer-executable instructions for controlling the one or more processors to:

determine P numbers of second pixel sets for each respective one of the Q numbers of third pixel groups, each of the P numbers of second pixel sets comprising a plurality of adjacent pixels in a respective one of the Q numbers of third pixel groups, P being a positive integer, P>M, and P is a non-integer multiple of M;

assign P numbers of pixels values respectively to the P numbers of second pixel sets for each respective one of the Q numbers of third pixel groups, each of the P numbers of pixel values being assigned based on pixel values of all pixels in a respective one of the P numbers of second pixel sets;

generate Q numbers of fourth pixel groups respectively for the Q numbers of third pixel groups, each of the Q numbers of fourth pixel groups comprising P numbers of pixels, pixel values of the P numbers of pixels respectively equal to the P numbers of pixels values respectively for the P numbers of second pixel sets for a respective one of the Q numbers of third pixel groups; and obtain the processed frame of video comprising the Q numbers of fourth pixel groups along the second direction.

12. The apparatus of claim 9, wherein the memory further stores computer-executable instructions for controlling the one or more processors to determine N numbers of first target pixel sets and (Q−N) numbers of second target pixel sets for each respective one of the M numbers of first pixel groups, thereby determining the Q numbers of first pixel sets for each respective one of the M numbers of first pixel groups, Q>N;
wherein each of the M numbers of second pixel groups comprises N numbers of first pixels and (Q−N) numbers of second pixels, any two adjacent second pixels of the (Q−N) numbers of second pixels being spaced apart by a same total number of first pixels of the N numbers of first pixels;
the N numbers of first target pixel sets respectively correspond to the N numbers of first pixels in a respective one of the M numbers of second pixel groups; and
the (Q−N) numbers second target pixel sets respectively correspond to the (Q−N) numbers of second pixels in the respective one of the M numbers of second pixel groups.

13. The apparatus of claim 12, wherein an i-th first target pixel set of the N numbers of first target pixel sets corresponds to an i-th first pixel of the N numbers of first pixels in the respective one of the M numbers of second pixel groups, 1≤i≤N; and
a first pixel in the i-th first target pixel set of the N numbers of first target pixel sets is an i-th pixel in a respective one of the M numbers of first pixel groups.

14. The apparatus of claim 12, wherein a j-th second target pixel set of the (Q−N) numbers of second target pixel sets corresponds to a j-th second pixel of the (Q−N) numbers of second pixels in the respective one of the M numbers of second pixel groups, 1≤j≤(Q−N); and
a first pixel in the j-th second target pixel set of the (Q−N) numbers of second target pixel sets is a z-th pixel in a respective one of the M numbers of first pixel groups; wherein $$z = \frac{j \times q}{q - n} - v - j - 1,$$

v is a constant;
1≤n≤N; and
1≤q≤Q.

15. The apparatus of claim 12, wherein the memory further stores computer-executable instructions for controlling the one or more processors to:
add A numbers of newly added pixel into each respective one of the M numbers of first pixel groups, A≥1; and
determine the Q numbers of first pixel sets for each respective one of the M numbers of first pixel groups having the at least one newly added pixel;
wherein a pixel value of each of the at least one newly added pixel is equal to a pixel value of a pixel in a respective one of the M numbers of first pixel groups; and
A=B−1, B is a total number of pixels in each of the N numbers of first target pixel sets.

16. The apparatus of claim 9, wherein the memory further stores computer-executable instructions for controlling the one or more processors to:

determine relative distances respectively between the respective one of the Q numbers of pixels in the respective one of the M numbers of second pixel groups and pixels in the respective one of the Q numbers of first pixel sets; and
determine the correlation coefficients respectively for the pixels in each of the Q numbers of first pixel sets for each respective one of the M numbers of first pixel groups based on the relative distances.

17. A display apparatus, comprising the apparatus for processing video data of claim 9.

18. A computer-program product comprising a non-transitory tangible computer-readable medium having computer-readable instructions thereon, the computer-readable instructions being executable by a processor to cause the processor to perform:
obtaining a frame of video comprising M numbers of first pixel groups along a first direction, each of the M numbers of first pixel groups comprising N numbers of pixels along a second direction, M and N being positive integers;
determining Q numbers of first pixel sets for each respective one of the M numbers of first pixel groups, each of the Q numbers of first pixel sets comprising a plurality of adjacent pixels in a respective one of the M numbers of first pixel groups, Q being a positive integer;
assigning Q numbers of pixels values respectively to the Q numbers of first pixel sets for each respective one of the M numbers of first pixel groups, each of the Q numbers of pixel values being assigned based on pixel values of all pixels in a respective one of the Q numbers of first pixel sets;
generating M numbers of second pixel groups respectively for the M numbers of first pixel groups, each of the M numbers of second pixel groups comprising Q numbers of pixels, pixel values of the Q numbers of pixels respectively equal to the Q numbers of pixels values respectively for the Q numbers of first pixel sets for a respective one of the M numbers of first pixel groups; and
obtaining a processed frame of video comprising the M numbers of second pixel groups along the first direction;
wherein assigning the Q numbers of pixels values respectively to the Q numbers of first pixel sets for each respective one of the M numbers of first pixel groups comprises:
determining correlation coefficients respectively for pixels in each of the Q numbers of first pixel sets for each respective one of the M numbers of first pixel groups; and
assigning the Q numbers of pixels values respectively to the Q numbers of first pixel sets for each respective one of the M numbers of first pixel groups based on the correlation coefficients and the pixel values of all pixels in the respective one of the Q numbers of first pixel sets;
wherein each of the correlation coefficients represents a degree of correlation between a respective pixel in the respective one of the Q numbers of first pixel sets and a respective one of the Q numbers of pixels in a respective one of the M numbers of second pixel groups.

* * * * *